United States Patent
Bank Tavakoli et al.

(10) Patent No.: US 12,197,773 B2
(45) Date of Patent: Jan. 14, 2025

(54) ACCELERATOR TO REDUCE DATA DIMENSIONALITY AND ASSOCIATED SYSTEMS AND METHODS

(71) Applicant: Samsung Electronics Co., Ltd., Suwon-si (KR)

(72) Inventors: Erfan Bank Tavakoli, Tempe, AZ (US); Xuebin Yao, Mountain View, CA (US); Amir Beygi, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/571,440

(22) Filed: Jan. 7, 2022

(65) Prior Publication Data
US 2023/0052433 A1 Feb. 16, 2023

Related U.S. Application Data

(60) Provisional application No. 63/239,402, filed on Aug. 31, 2021, provisional application No. 63/233,739, filed on Aug. 16, 2021.

(51) Int. Cl.
*G06F 3/06* (2006.01)

(52) U.S. Cl.
CPC .......... *G06F 3/0656* (2013.01); *G06F 3/0604* (2013.01); *G06F 3/0679* (2013.01)

(58) Field of Classification Search
CPC ..... G06F 3/0656; G06F 3/0604; G06F 3/0679
USPC ....................................................... 711/154
See application file for complete search history.

(56) References Cited

U.S. PATENT DOCUMENTS

| | | | |
|---|---|---|---|
| 8,340,405 B2* | 12/2012 | Cooper | G06V 20/10 382/190 |
| 10,970,629 B1 | 4/2021 | Dirac et al. | |
| 2016/0307043 A1* | 10/2016 | Neumeier | G06V 40/172 |
| 2018/0315159 A1* | 11/2018 | Ould-Ahmed-Vall | G06N 3/063 |
| 2021/0182077 A1 | 6/2021 | Chen et al. | |
| 2021/0201466 A1* | 7/2021 | Chen | G06V 10/993 |
| 2021/0256538 A1 | 8/2021 | Butvinik | |
| 2022/0114270 A1* | 4/2022 | Wang | G06F 9/5027 |

FOREIGN PATENT DOCUMENTS

| | | |
|---|---|---|
| CN | 110689064 A | 1/2020 |
| WO | 2018009887 A1 | 1/2018 |
| WO | 2020102881 A1 | 5/2020 |

OTHER PUBLICATIONS

Lu et al: "CHIP-KNN: A Configurable and High-Performance K-Nearest Neighbors Accelerator on Cloud FPGAs", 2020 International Conference on Field-Programmable Technology, IEEE, Dec. 9, 2020, pp. 139-147. (Year: 2020).*

Hyvonen et al: "Fast k-NN search", Arxiv.org, Cornell University Library, Sep. 23, 2015. (Year: 2015).*

(Continued)

*Primary Examiner* — Than Nguyen
(74) *Attorney, Agent, or Firm* — Renaissance IP Law Group LLP

(57) ABSTRACT

An device is disclosed. A first buffer to store a query data point, and a second buffer to store a matrix of candidate data points. A processing element may process the query data point and the matrix of candidate data points to identify candidate data points in the matrix of candidate data points that are nearest to the query data point.

19 Claims, 19 Drawing Sheets

(56) References Cited

OTHER PUBLICATIONS

Arriaga, Rosa I. et al., "An Algorithmic Theory of Learning: Robust Concepts and Random Projection," Machine Learning, vol. 63, No. 2, 2006, pp. 161-182.
European Extended Search Report for Application No. 22183262.9, mailed Jan. 25, 2023.
Fox, Sean et al., "Random Projections for Scaling Machine Learning on FPGAs," 2016 International Conference on Field-Programmable Technology (FPT), IEEE 2016, 8 pages.
Guo, Gongde et al., "KNN Model-Based Approach in Classification," OTM Confederated International Conferences, On The Move to Meaningful Internet Systems, Springer, 2003, 12 pages.
Hyvonen, Ville et al., "Fast k-NN Search," IEEE International Conference on Big Data 2016, arXiv preprint arXiv:1509.06957, 2016, 10 pages.
Johnson, William B. et al., "Extensions of Lipschitz Mappings into a Hilbert Space", Contemporary Mathematics, vol. 26, 1984, pp. 189-206.
Li, Ping et al., "Very Sparse Random Projections," Proceedings of the 12th ACM SIGKDD International Conference on Knowledge Discovery and Data Mining, 2006, pp. 287-296.
Lu, Alec et al., "CHIP-KNN: A Configurable and High-Performance K-Nearest Neighbors Accelerator on Cloud FPGAs," 2020 International Conference on Field-Programmable Technology (ICFPT), IEEE, 2020, 9 pages.
Pedregosa, Fabian et al., "Scikit-learn: Machine Learning in Python," Journal of Machine Learning Research, vol. 12, 2011, pp. 2825-2830.
Seidl, Thomas et al., "Optimal Multi-Step k-Nearest Neighbor Search," SIGMOD '98: Proceedings of the 1998 ACM SIGMOD International Conference on Management of Data, 1998, pp. 154-165.
Song, Xiaojia et al., "A Memory-Access-Efficient Adaptive Implementation of kNN on FPGA through HLS," 2019 IEEE 37th International Conference on Computer Design (ICCD), IEEE, 2019, pp. 177-180.
Sun, Gongjin et al., "Bandwidth Efficient Near-Storage Accelerator for High-Dimensional Similarity Search", 2020 International Conference on Field-Programmable Technology (ICFPT), IEEE, 2020, 3 pages.
Woods, Roger et al., "FPGA-Based Implementation of Signal Processing Systems," John Wiley & Sons, 2008, 26 pages.
Wu, Xindong et al., "Top 10 Algorithms in Data Mining," Knowledge and Information Systems, Springer, vol. 14, No. 1, 2007, pp. 1-37.
Yang, Ning et al., "Genome Wide Association Studies Using a New Nonparametric Model Reveal the Genetic Architecture of 17 Agronomic Traits in an Enlarged Maize Association Panel," PLOS Genetics, vol. 10, No. 9, 2014, pp. 1-14.
Yao, Bin et al., "K Nearest Neighbor Queries and KNN-Joins in Large Relational Databases (Almost) for Free," 2010 IEEE 26th International Conference on Data Engineering (ICDE 2010), IEEE, 2010, 14 pages.
Zhang, Jialiang et al., "Efficient Large-Scale Approximate Nearest Neighbor Search on OpenCL FPGA," Proceedings of the IEEE Conference on Computer Vision and Pattern Recognition (CVPR), 2018, pp. 4924-4932.

* cited by examiner

ACCELERATOR TO REDUCE DATA DIMENSIONALITY AND ASSOCIATED SYSTEMS AND METHODS

RELATED APPLICATION DATA

This application claims the benefit of U.S. Provisional Patent Application Ser. No. 63/233,739, filed Aug. 16, 2021, and U.S. Provisional Patent Application Ser. No. 63/239,402, filed Aug. 31, 2021, both of which are incorporated by reference herein for all purposes.

FIELD

The disclosure relates generally to accelerators, and more particularly to an accelerator to support reducing data dimensionality.

BACKGROUND

The present background section is intended to provide context only, and the disclosure of any concept in this section does not constitute an admission that said concept is prior art.

Problems, such as identifying the nearest neighbors of a data point, may involve large datasets, with each data point potentially represented as a vector including a large number of coordinates. Solving such problems, which may involve comparing each coordinate in every data point with the corresponding coordinate in every other data point, may be computationally and time intensive.

A need remains to improve the performance in processing data.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
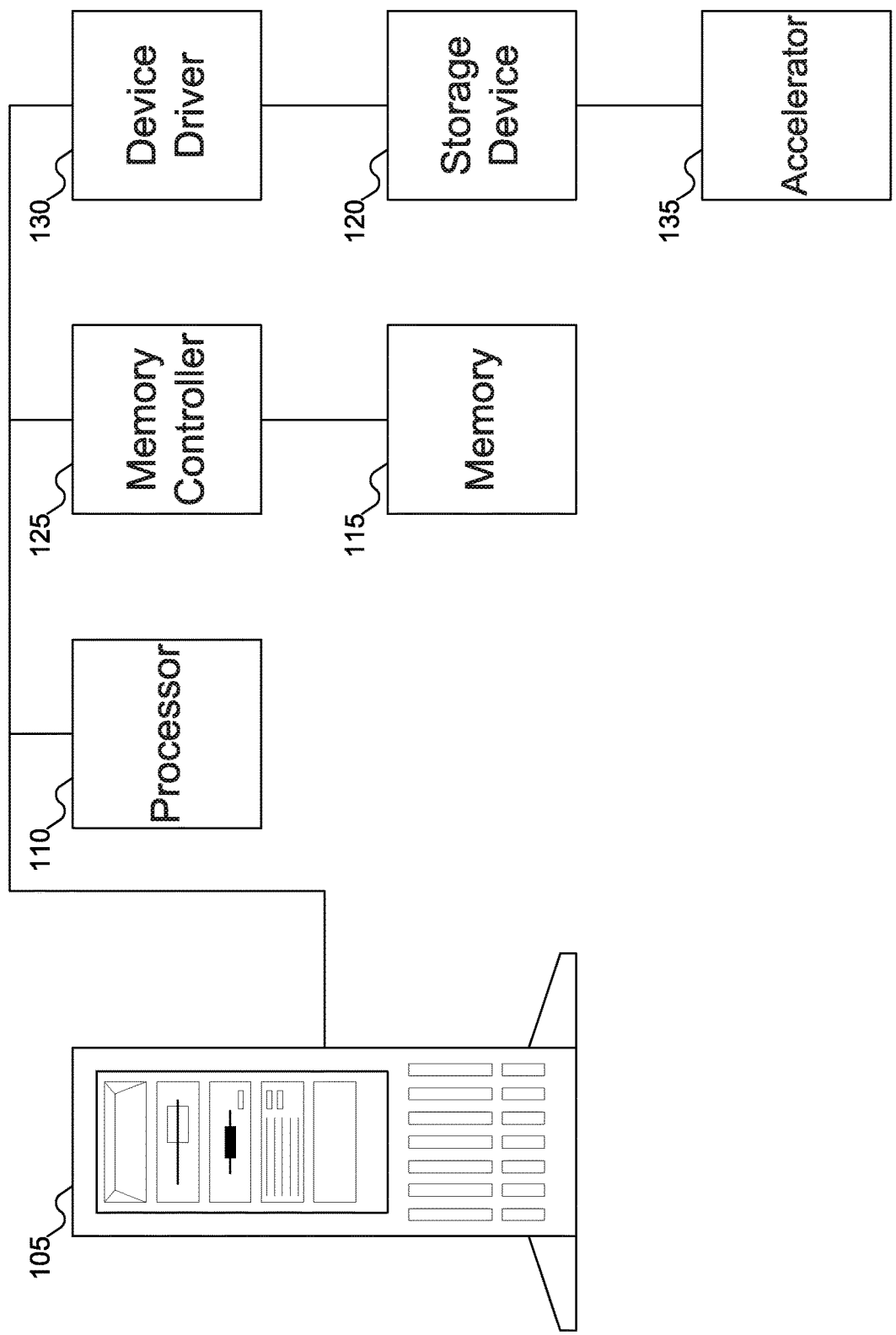
FIG. 1 shows a machine including an accelerator to reduce data dimensionality and perform calculations, according to embodiments of the disclosure.

Embodiments of the disclosure include an accelerator to perform random projection on data points to reduce the dimensionality of the data points. Once the dimensionality of the data points has been reduced, a processing element may be used to determine the k-nearest neighbors of a query data point.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

One outstanding area of investigation in computing, such as in machine learning, includes the k-nearest neighbor problem. Given a set of candidate data points and identifying a particular query data point, the k-nearest neighbors of the given data point are located in the set. The k-nearest neighbors may then be classified using any suitable classification process, and the given data point may be grouped with the classification that includes the greatest number of neighbors of the given data point.

As a (relatively simplified) example, the candidate data points may pair the ages of various people with their pizza topping preference. To add a candidate person to the set, the k persons whose ages are closest to another person may be identified. The candidate person may then be assigned the pizza topping that is favored by the largest subset of the k persons whose ages are closest to the candidate person.

But as the size of the set and the amount of information used to represent a data point grow, the problem of identifying the k-nearest neighbors may become increasing complex. It is possible for each candidate data point to include, for example, approximately 1000 (or more) values in a vector format, and for the dataset to include 1,000,000 (or more) data points.

To improve performance, embodiments of the disclosure may include an accelerator and/or any functionality or module that can at least partially perform computational acceleration in the manner described herein. The accelerator may be located near to the storage where the set of data points is stored. The data points may have their dimensionality reduced in a manner that retains distance between the data points. Once the dimensionality of the data points has been reduced, the accelerator may determine the k-nearest neighbors. Embodiments of the disclosure may support parallel identification of nearest neighbors for two or more different query data points. Embodiments of the disclosure may reduce the dimensionality of the data by the storage device or by the accelerator.

FIG. 1 shows a machine including an accelerator to reduce data dimensionality and perform calculations, according to embodiments of the disclosure. In FIG. 1, machine 105, which may also be termed a host or a system, may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115. When storage device 120 is used to support applications reading or writing data via some sort of file system, storage device 120 may be accessed using device driver 130. While FIG. 1 shows one storage device 120, there may be any number (one or more) of storage devices in machine 105.

While FIG. 1 uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure.

Machine 105 may also include accelerator 135 (which may also be termed a device). As discussed below, accelerator 135 may support solving problems, and in particular may support solving problems that may benefit from reducing data dimensionality. Accelerator 135 is shown as communicating with storage device 120, but if the data is stored somewhere other than storage device 120, accelerator 135 may communicate with other storage location(s) (such as memory 115 or network locations accessed across a network not shown in FIG. 1).

Accelerator 135 may be implemented using any desired hardware. For example, accelerator 135, or components thereof, may be implemented using a Field Programmable Gate Array (FPGA), an Application-Specific Integrated Circuit (ASIC), a central processing unit (CPU), a graphics processing unit (GPU), a general purpose GPU (GPGPU), a Data Processing Unit (DPU), or a Tensor Processing Unit (TPU), to name a few possibilities. Accelerator 135 may also use a combination of these elements to implement accelerator 135. Finally, accelerator 135 may be implemented as a computational storage unit, which may be used to support operations on storage device 120.

Figure 2:
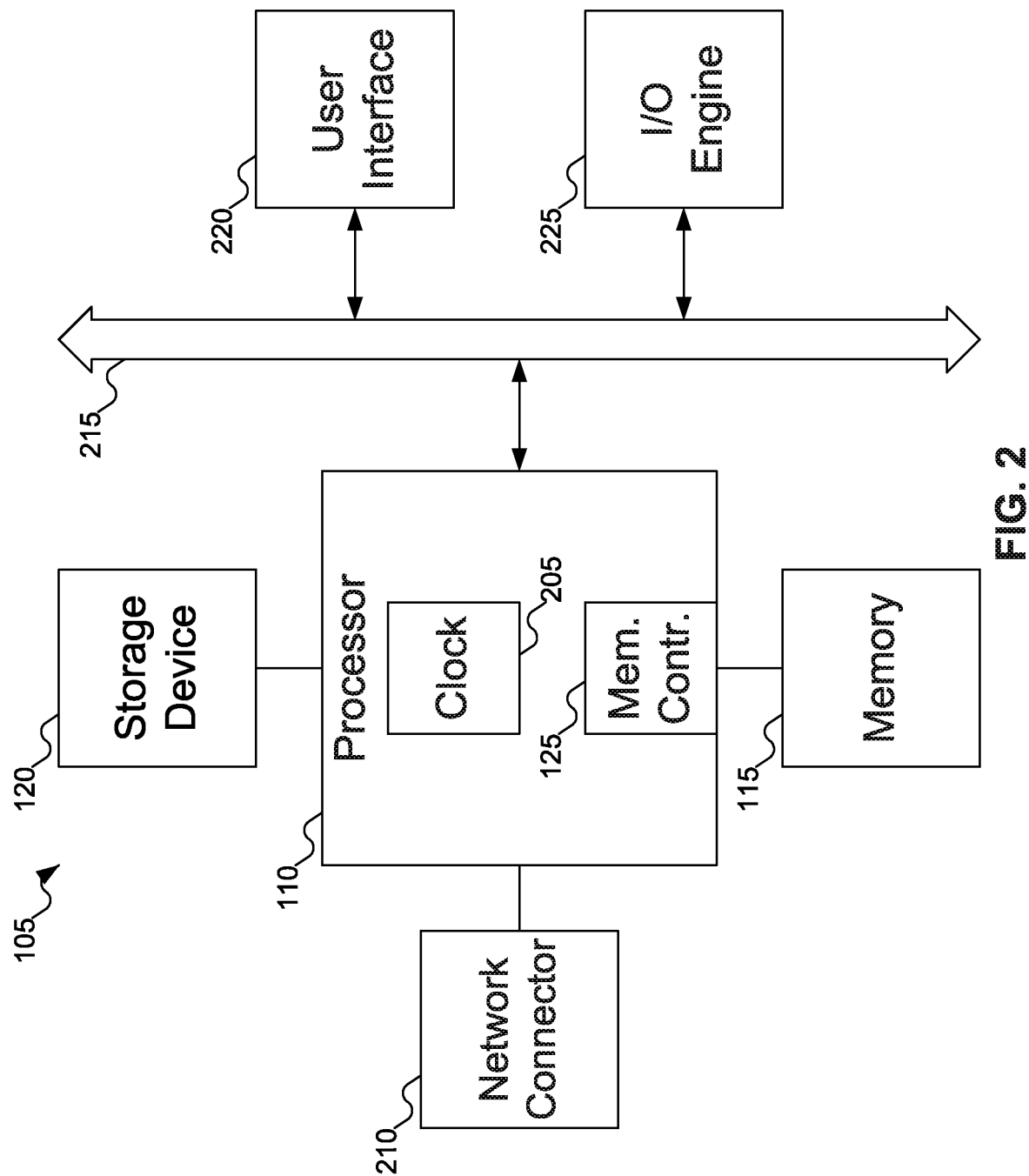
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3A:
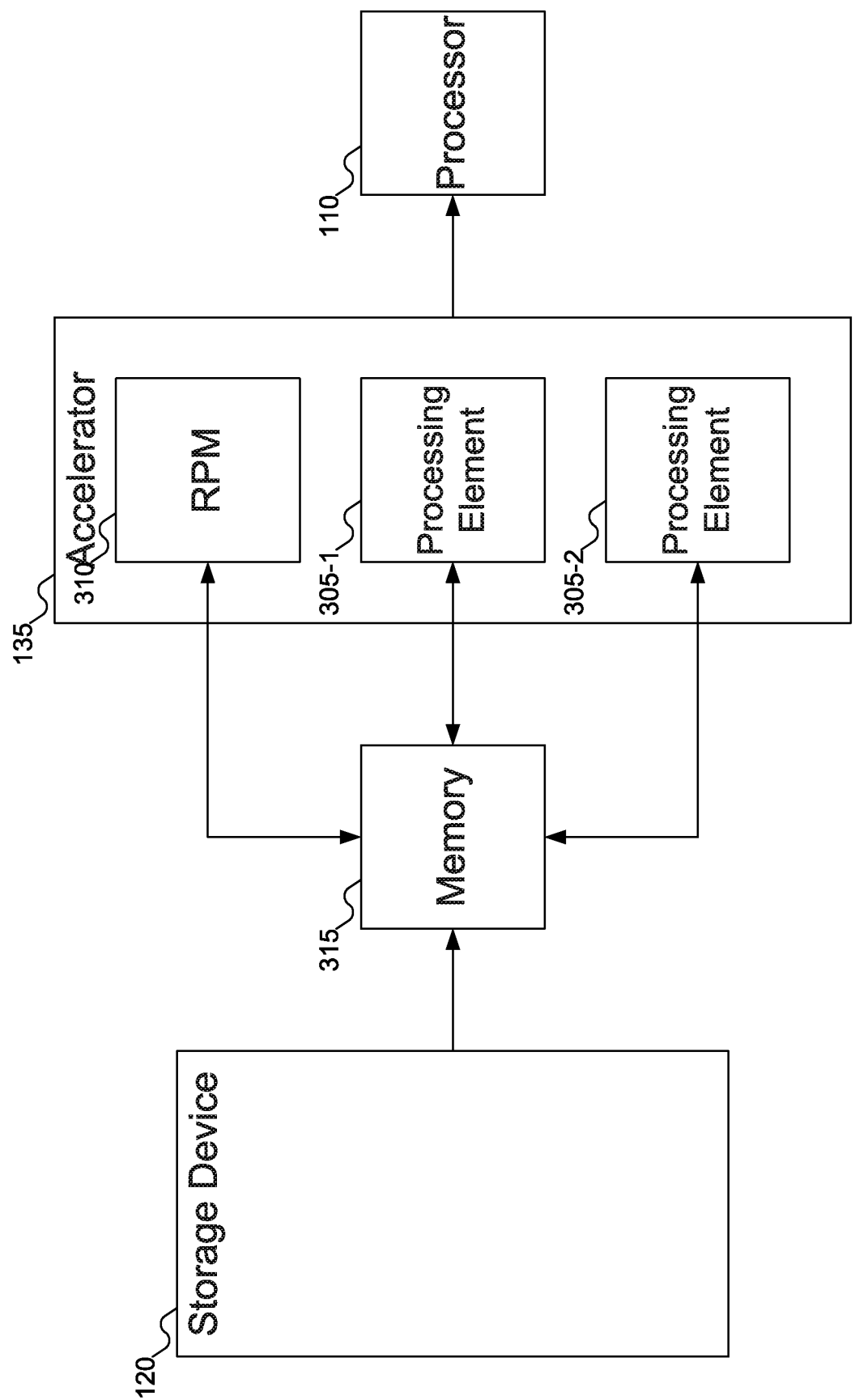
FIG. 3A shows an architecture to use the accelerator of FIG. 1, according to embodiments of the disclosure.

FIG. 3A shows an architecture to use accelerator 135 of FIG. 1, according to embodiments of the disclosure. In FIG. 1, storage device 120 may communicate with a memory 315. For example, memory 315 may be used to store data relating to the problem being solved. Storage device 120 may load the pertinent data into memory 315 for use by accelerator 135. While FIG. 3A shows storage device 120 as storing the data to be loaded into memory 315, embodiments of the disclosure may store the data in any desired component. For example, storage device 120 may be replaced with memory 115 of FIG. 1, a cache of processor 110, a networked storage location from which the data may be retrieved, etc. Memory 315 may be any variety of storage, including all the varieties described above; memory 315 might also take other forms, such as a cache that might be in a processor. For example, storage device 120 might include a processor which might include a cache, which might be used as memory 315.

The data from memory 315 may be used by accelerator 135: more particularly, memory 315 may be accessed by random projection module 310 and/or processing elements 305-1 and 305-2 (which may be referred to collectively as processing elements 305). Random projection module 310 may be used to reduce the dimensionality of the data (as stored by storage device 120) so that processing elements 305 may then more efficiently solve the problem on the data with reduced dimensionality. As an example, processing elements 305 may implement solutions to the nearest neighbor problem. Finally, accelerator 135 may communicate with 110 to return the solution to the problem.

While FIG. 3A shows a particular arrangement of elements, embodiments of the disclosure may include, replace, or omit various elements, as appropriate. For example, if storage device 120 may read and/or write data with sufficient speed, memory 315 may be omitted in favor of accelerator 135 communicating directly with storage device 120. For example, if storage device 120 includes a form of RAM or a cache memory with a sufficient amount of storage and sufficiently low latency, the benefit of moving the data from storage device 120 to memory 315 may be negligible. On the other hand, even if storage device 120 has sufficient storage capacity and low latency to support access from accelerator 135, it may be beneficial to transfer the data from storage device 120 (which might also be processing requests from sources other than accelerator 135) to memory 315 (which might be "dedicated" or otherwise insufficiently used by other components of system 105 of FIG. 1 to be considered dedicated to accelerator 135) to support more efficient processing of the data.

Note that in some embodiments of the disclosure memory 315 might be the same as memory 115 of FIG. 1, but in other embodiments of the disclosure memory 315 might be different from memory 115 of FIG. 1. For example, memory 315 might provide more direct access to the data for accelerator 135 than memory 115 of FIG. 1 (for example, memory 315 might be directly connected to storage device 120 and accelerator 135, rather than being on a memory bus). In addition, while FIG. 3A shows memory 315 as being separate from both storage device 120 and accelerator 135, such is not required. For example, memory 315 might be part of storage device 120 or accelerator 135.

While FIG. 3A shows accelerator 135 as including two processing elements 305, embodiments of the disclosure may include any number (one or more) of processing elements 305. That is, accelerator 135 (or more generally, system 105 of FIG. 1) may include as many processing elements 305 as desired, which may enable solving multiple problems in parallel.

FIG. 3A shows random projection module 310 and processing elements 305 both as part of accelerator 135. FIG. 3A also shows random projection module 310 and processing elements 305 separately interfacing with memory 315. In other words, random projection module 310 may access data from memory 315, reduce the dimensionality of that data, and write the data back into memory 315. Processing elements 305 may then read that data from memory 315 to process the data as appropriate to the problem: for example, processing elements 305 may determine the nearest neighbors to a query data point in a set of candidate data points.

By writing the data back from random projection module 310 to memory 315, embodiments of the disclosure may enable multiple different uses of the data after dimensionality is reduced. For example, multiple different nearest neighbor problems (or other problems) may be analyzed based on the reduced dimensionality data. But other embodiments of the disclosure may operate in various other ways. For example, random projection module 310 may provide the data directly to processing elements 305, rather than writing the data back to memory 315. In addition, embodiments of the disclosure may locate random projection module 310 and processing elements 305 differently. For example, random projection module 310 and processing elements 305 may be located in different accelerators 135, or even outside any accelerator 135.

Figure 3B:
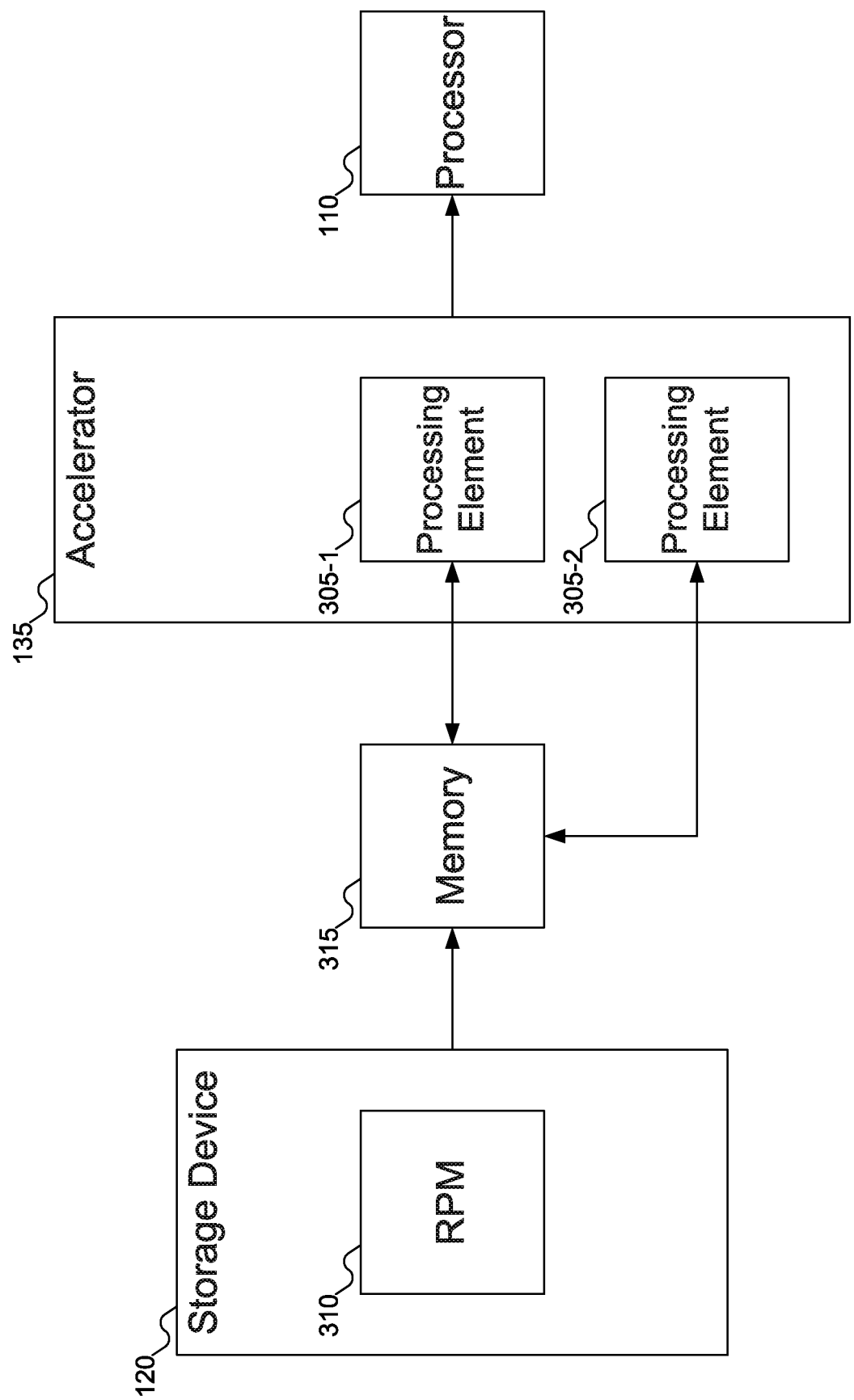
FIG. 3B shows a second architecture to use the accelerator of FIG. 1, according to embodiments of the disclosure.

FIG. 3B shows one such embodiment of the disclosure. In FIG. 3B, random projection module 310 is shown as part of storage device 120. For example, storage device 120 might include logic or circuitry to implement random projection module 310 as part of a controller for storage device 120. Or, storage device 120 might include a processor that may execute random projection module 310 as a program to reduce data dimensionality. Embodiments of the disclosure may include random projection module 310 as part of storage device 120 in other ways as well. In embodiments of the disclosure as shown in FIG. 3B, random projection module 310 may read data from storage device 120, perform random projection to reduce the data dimensionality, and write the resulting reduced dimensionality data to memory 315 for later use by accelerator 135.

Figure 4:
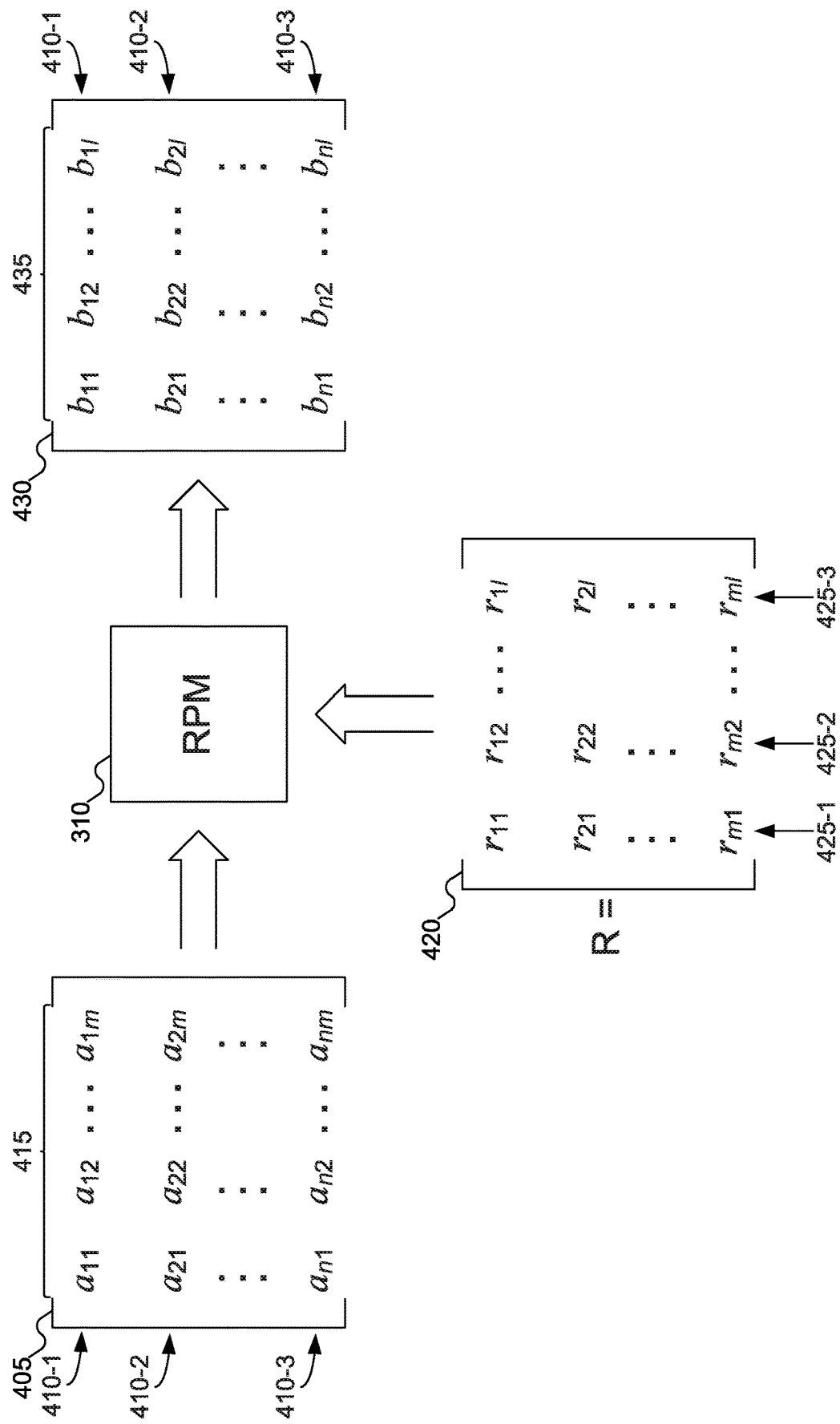
FIG. 4 shows the use of the random projection module of FIGS. 3A-3B to reduce data dimensionality, according to embodiments of the disclosure.

FIG. 4 shows the use of random projection module 310 of FIGS. 3A-3B to reduce data dimensionality, according to embodiments of the disclosure. In FIG. 4, matrix 405 may be a representation of a set of data points. Each data point may be a vector in matrix 405, with each vector including some number of coordinates. For example, matrix 405 may represent data points as rows in matrix 405: these rows may include vectors 410-1, 410-2, and 410-3 (which may be referred to collectively as vectors 410 and which may be identified as vectors $\vec{a}_1$, $\vec{a}_2$, and so on up to $\vec{a}_n$). Each vector 410 may include m coordinates: the value of m may be identified as dimensionality 415 of matrix 405.

To reduce dimensionality 415 of matrix 405, matrix 405 may be multiplied by random projection matrix 420. In matrix multiplication, multiplying an n×m matrix by an m×l matrix may produce an n×l matrix. Thus, random projection matrix 420 may be an m×l matrix. Individual columns in random projection matrix 420 may be referred to as random projection vectors 425-1, 425-2, and 425-3 (which may be referred to collectively as random projection vectors 425).

In matrix multiplication, a row from matrix 405 may be multiplied, coordinate by coordinate, with a column from matrix 420. The sum of these individual multiplications may then be computed, which may be a single entry in matrix 430: which entry may be determined based on which row in the first matrix and which column in the second matrix are used. For example, multiplying vector 410-1 by random projection vector 425-1 may produce the entry in matrix 430 labeled $b_{11}$; multiplying vector 410-2 by random projection vector 425-1 may produce the entry in matrix 430 labeled $b_{21}$, and so on. Note that the vectors in matrix 430 may have l coordinates: the value of l may be identified as dimensionality 435 of matrix 430. In some embodiments of the disclosure, dimensionality 435 of matrix 430 may be smaller than dimensionality 415 of matrix 405. Note too that the rows in matrix 430 may have different values than the rows in matrix 405; however, as the rows in matrix 405, are intended to be reduced dimensionality equivalents to the rows in matrix 405, the rows in matrix 430 may also be thought of as vectors 410 (despite different values and a different dimensionality).

In some embodiments of the disclosure, the values in random projection matrix 420 may be selected "at random". But in some embodiments of the disclosure, random projection matrix 420 may be selected so as to preserve certain properties of vectors 410 (for example, the relative distance between the vectors 410). If preserving certain properties is important, there may be some limits on what values may be used. For example, the values in random projection matrix 420 may be selected according to the following equation:

$$r_{ij} = \sqrt{\frac{s}{l}} \times \begin{cases} 1 & \text{with probability } 1/2s \\ 0 & \text{with probability } 1 - 1/s \\ -1 & \text{with probability } 1/2s \end{cases}$$

where s is a tunable parameter that may control how sparse random projection matrix 420 is and l is the target dimensionality. The advantage of having random projection matrix 420 be sparse is discussed further with reference to FIG. 6 below.

Note that except for the scaling factor $$\sqrt{\frac{s}{l}},$$

the values in random projection matrix 420 are 1, 0, or −1. Thus, in some embodiments of the disclosure, random projection matrix 420 may be stored in a compressed format that minimizes the amount of data actually stored. One such format may be a compressed sparse row (CSR) format. The CSR format uses three one-dimensional arrays to represent a matrix. One array contains non-zero values, a second array contains column index information, and a third array contains row index information. But because the non-zero values are limited to two different values (1 and −1 or $$\sqrt{\frac{s}{l}} \text{ and } -\sqrt{\frac{s}{l}},$$

depending on the preferred understanding), only one bit is actually needed to represent the possible non-zero values. For example, a zero bit may represent the value 1 (or $$\sqrt{\frac{s}{l}}),$$

and a one bit may represent the value −1 (or $$-\sqrt{\frac{s}{l}}).$$

This representation may further reduce the amount of data to be stored.

In addition, recall that matrix multiplication involves multiplying individual rows in the first matrix with individual columns in the second matrix, and summing the pairwise products, with each computation producing a single value in the matrix product. Because every non-zero value in random projection matrix 420 is 1 or −1 scaled by $$\sqrt{\frac{s}{l}}, \sqrt{\frac{s}{l}}$$

may be omitted from the calculation of the vector product. This scaling factor $$\sqrt{\frac{s}{l}}$$

may be omitted from the calculation until after the pairwise multiplications are performed and the products summed: that is, the values in random projection matrix 420 may be assumed to be 1 or −1 while performing the pairwise products, and later the sum may be multiplied by the scaling factor $$\sqrt{\frac{s}{l}}.$$

This approach means that multiplication by the scaling factor $$\sqrt{\frac{s}{l}}$$

may be performed only once, further reducing the workload.

While FIG. 4 represents data points 410 in matrix 405, embodiments of the disclosure may support any equivalent data structures to represent data points 410 as an alternative to matrix 405. Examples of other data structures that may be used include, for example, using or more tables of data, one or more linked lists, etc. The term "matrix" is intended to cover any possible data structures used to represent data points 410.

Figure 5:
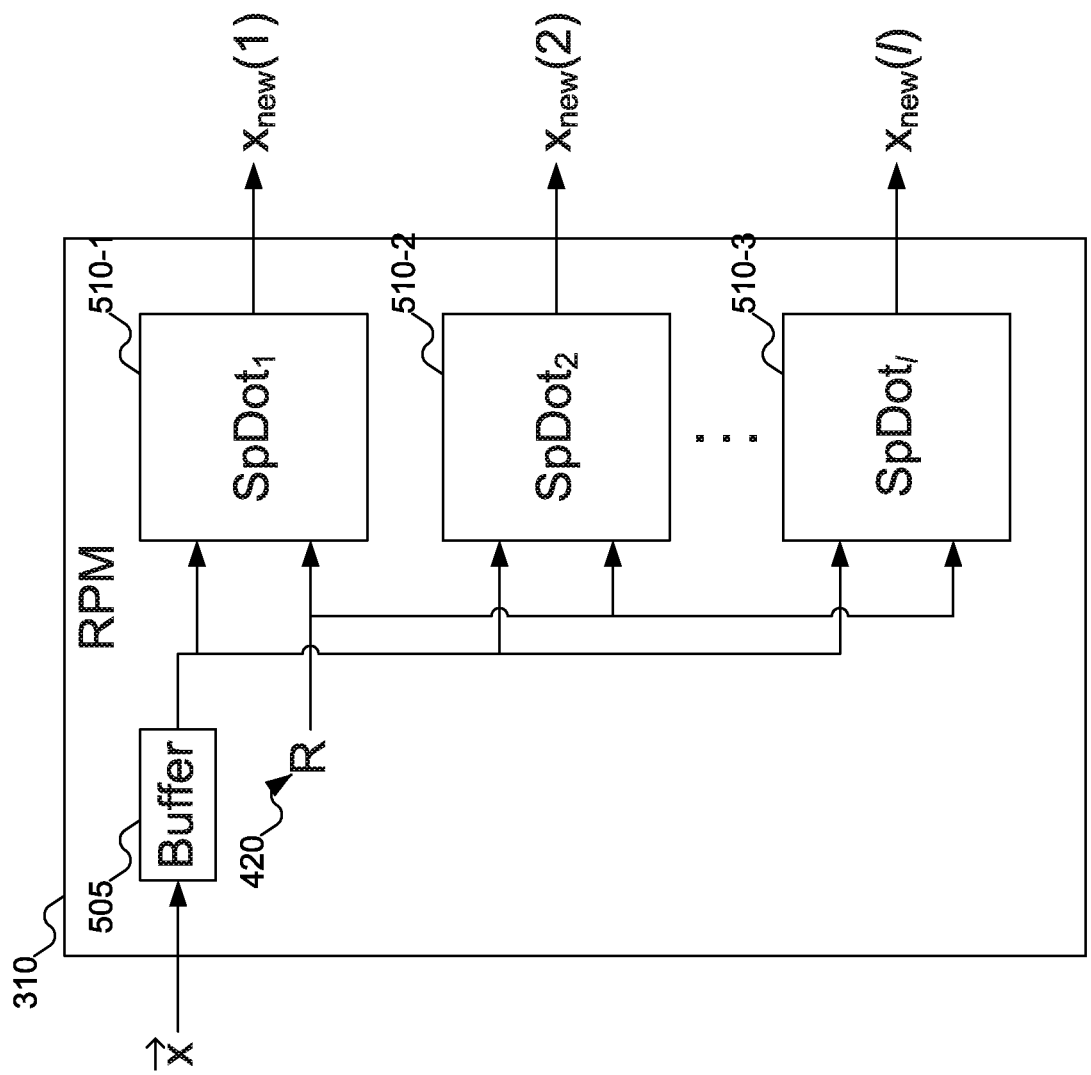
FIG. 5 shows details of the random projection module of FIGS. 3A-3B, according to embodiments of the disclosure.

FIG. 5 shows details of random projection module 310 of FIGS. 3A-3B, according to embodiments of the disclosure. In FIG. 5, random projection module 310 may include buffer 505 and sparse dot product modules 510-1 through 510-3 (which may be referred to collectively as sparse dot product modules 510). Buffer 505 may store a vector—that is, a data point—from matrix 405 of FIG. 4. In FIG. 5, this vector is identified as $\vec{x}$. By storing the vector $\vec{x}$ in buffer 505, sparse dot product modules 510 may access the vector $\vec{x}$ as needed without having to include their own buffers and without having to refer back to memory 315 of FIGS. 3A-3B or storage device 120 of FIG. 1. Buffer 505 may take any form: for example, buffer 505 may be implemented as any form of RAM or as a processor cache. Buffer 505 may be a relatively small but fast storage (since a vector such as $\vec{x}$ may contain a number of coordinates). Assuming, for example, 1000 coordinates in vector $\vec{x}$ with each coordinate being a floating point value, as each floating point value may use four bytes of storage, the total storage needed would be 4000 bytes. Even using more bytes per coordinate (for example, eight bytes) would only require 8000 bytes: similarly, increasing the number of coordinates per vector would increase the needed storage. But 1 megabyte (MB) or less of storage in buffer 505 may be sufficient for all practical purposes.

Sparse dot product modules 510, as mentioned above, perform a sparse dot product, using both vector $\vec{x}$ and a column from random projection matrix 420 (this column may be referred to as a random projection vector). As mentioned above, a dot product may involve multiplying corresponding values in the vector $\vec{x}$ and the random projection vector, then summing the results. Mathematically, if $\vec{x} = \langle x_1, x_2, x_3, \ldots \rangle$ and the random projection vector $r = \langle r_1, r_2, r_3, \ldots \rangle$, then a dot product may be represented as $DP(x, r) = \Sigma_i x_i \times r_i$. If each sparse dot product module 510 uses a different random projection vector (that is, each sparse dot product module 510 uses a different column from random projection matrix 420), then each sparse dot product module 510 may produce a different coordinate in a version of the vector $\vec{x}$ that has reduced dimensionality: this vector may be represented as $\vec{x}_{new}$. Thus, $\vec{x}_{new} = \langle x_{new}(1), x_{new}(2), x_{new}(3), \ldots \rangle$. Note that as each sparse dot product module 510 may use vector $\vec{x}$ to calculate a coordinate in vector $\vec{x}_{new}$, each sparse dot product module 510 may access buffer 505.

In some embodiments of the disclosure, there may be one sparse dot product module 510 for each coordinate in the vector $\vec{x}_{new}$. This fact explains why random projection module 310 is shown as including l sparse dot product modules 510: each sparse dot product module 510 calculates one coordinate in the vector $\vec{x}_{new}$. Note too that the value l may correspond to dimensionality 435 of FIG. 4 of matrix 430 of FIG. 4, and may be smaller than dimensionality 415 of FIG. 4 of matrix 405 of FIG. 4, meaning that the vector $\vec{x}_{new}$ may have fewer coordinates than the vector $\vec{x}$ (a reduced dimensionality). In other embodiments of the disclosure, there may be fewer than l sparse dot product modules 510, with one or more sparse dot product modules 510 calculating two or more coordinates in the vector $\vec{x}_{new}$. For example, random projection module 310 might include only one sparse dot product module 510, with sparse dot product module 510 iteratively calculating each coordinate in the vector $\vec{x}_{new}$.

While not shown in FIG. 5, embodiments of the disclosure may include a buffer to store random projection matrix 420, and sparse dot product modules 510 may access the random projection vectors from this buffer. This buffer may be the same buffer as buffer 505, or this buffer may be a separate buffer. But since each sparse dot product module 510 may use a different random projection vector from random projection matrix 420, a buffer to store these random projection vectors may be omitted. Similarly, buffer 505 may be omitted, leaving sparse dot product modules 510 to access the vector $\vec{x}$ from memory 315 of FIGS. 3A-3B or storage device 120 of FIG. 1, at the potential cost of slower access to vector $\vec{x}$.

At this point, it may be unclear why modules 510 in random projection module 310 are termed sparse dot product modules. After all, if modules 510 are simply performing a conventional dot product, why should modules 510 be described as sparse dot product modules? But while sparse dot product modules 510 might implement a typical dot product, there are potential advantages to leverage a sparse random projection vector, particularly a random projection vector where the values are limited to zero and $$\pm \sqrt{\frac{s}{l}}$$

and where the random projection vector is stored in a CSR format.

First, recall that a dot product may be calculated as the sum of the product of individual coordinates in the input vectors. If one of the values to be multiplied is zero, then that specific product may be zero, and might not contribute to the result of the dot product. If the random projection vector is sparse (meaning that there are relatively few values that are non-zero), then identifying which values are non-zero and only performing calculations on those values may be more efficient than a conventional dot product operation.

Second, if the non-zero values in random projection value are limited to $$\pm \sqrt{\frac{s}{l}},$$

then two enhancements may be utilized. One enhancement is to factor out $$\sqrt{\frac{s}{l}}$$

from the individual products, and instead multiply the result of the addition operation (on values from the vector $\vec{x}$) by $$\sqrt{\frac{s}{l}}.$$

Thus, instead of potentially performing l multiplications, only one multiplication need be performed. Another enhancement is that after factoring $$\sqrt{\frac{s}{l}}$$

out of the individual multiplications, what remains is to "multiply" a coordinate of the vector $\vec{x}$ by either 1 or −1. Since multiplication by 1 does not change the value and multiplication by −1 may involve just calculating the twos complement of the coordinate, the addition operation may be reduced to just adding particular coordinates from the vector $\vec{x}$ or the twos complement of particular coordinates from the vector $\vec{x}$. (While the above discussion focuses on the use of twos complement notation to multiply a coordinate by −1, embodiments of the disclosure may extend to use any format to represent the additive inverse of a number.)

Finally, if the random projection vector is stored in the CSR format, this format may be leveraged to further enhance efficiency. Recall that the CSR format includes three vectors, one array contains non-zero values, a second array contains column index information, and a third array contains row index information. The arrays storing information about which entries in the random projection vector are non-zero may be used to identify which values from the vector $\vec{x}$ may affect the result of the sparse dot product calculation. Further, the array indicating the non-zero values may be used to control whether the original coordinate value or its twos complement is used in the addition operation.

Figure 6:
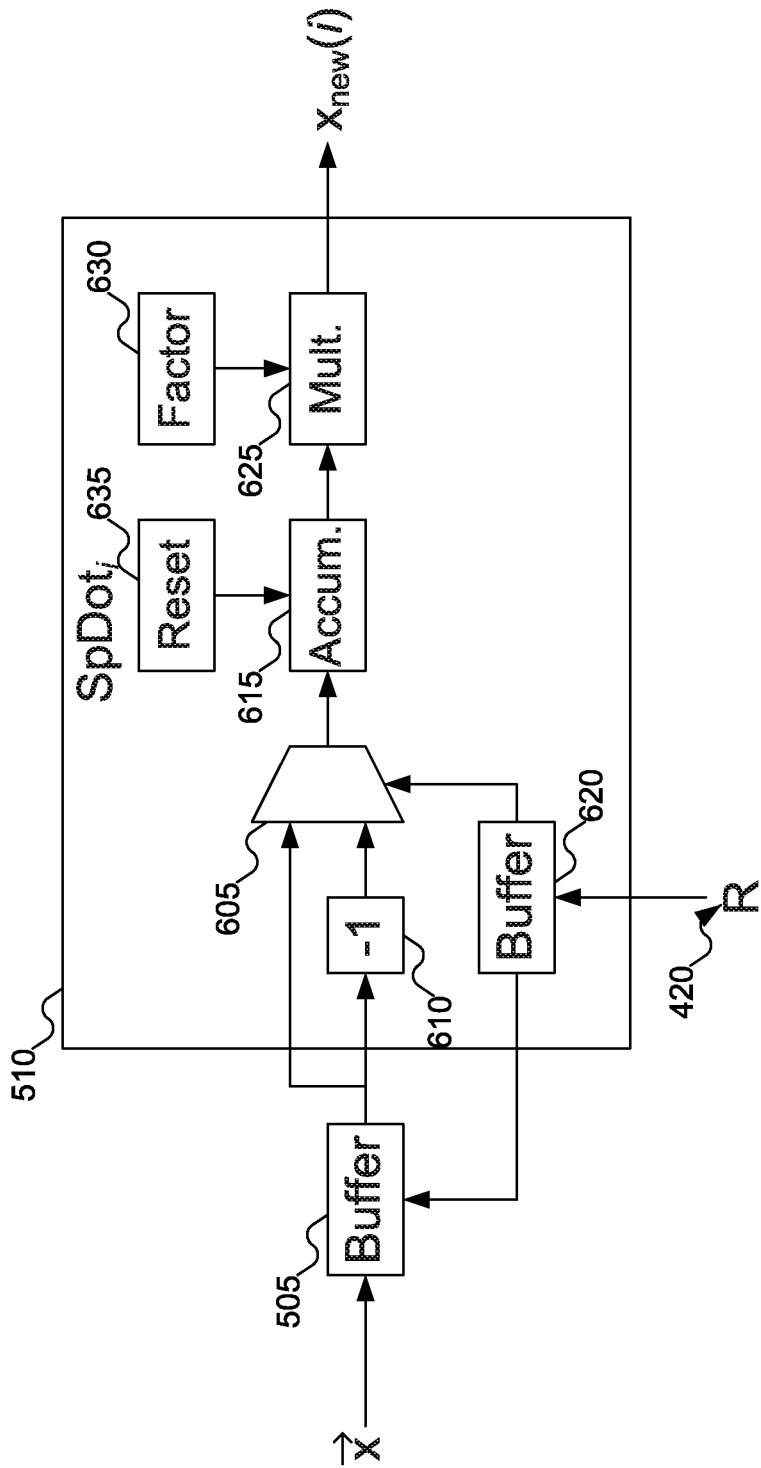
FIG. 6 shows details of the sparse dot product module of FIG. 5, according to embodiments of the disclosure.

FIG. 6 illustrates these enhancements that may be used in sparse dot product module 510. In FIG. 6, buffer 505 is shown as receiving the vector $\vec{x}$. Random projection matrix 420 (more particularly, the random projection vector, which may be a column in random projection matrix 420) may be used to select values from the vector $\vec{x}$ to sum (since coordinates from the vector $\vec{x}$ that would be multiplied by zero may be omitted without loss of accuracy).

Once coordinates from the vector $\vec{x}$ that are paired with non-zero values from random projection matrix 420 are identified, these values may be fed into multiplexer 605 in both their original and inverted form. That is, the original value may be provided as input to multiplexer 605, and the original value may be multiplied by −1 (as shown by inverter 610), which may also be provided as input to multiplexer 605. The corresponding value in random projection matrix 420 may then be used to control which value is output from multiplexer 605: if the corresponding value in random projection matrix 420 is 1, then the original value from the vector $\vec{x}$ may be selected; otherwise, the inverse of the original value from the vector $\vec{x}$ (as inverted by inverter 610) may be selected. The selected value may then be added to the accumulated value, stored in accumulator 615.

Note that random projection matrix 420 may be used for two purposes: to select coordinates from the vector $\vec{x}$, and to control whether the coordinate or its additive inverse is selected for accumulation by multiplexer 605. To support both operations, in some embodiments of the disclosure sparse dot product module 510 may include buffer 620, which may keep a copy of random projection matrix 420 (or the random projection vector) available locally in sparse dot product module 510 for both purposes. In some embodiments of the disclosure, buffer 620 may be omitted, and random projection matrix 420 may be used directly for both purposes.

Once accumulator 615 has accumulated all the values (or inverted values) from the vector $\vec{x}$, the result may be scaled by multiplier 625. Multiplier 625 may scale the accumulation by factor 630, which may be, for example, the value $$\sqrt{\frac{s}{l}}$$

(and in some embodiments of the disclosure may be fixed in advance; in other embodiments of the disclosure, factor 630 may be stored when a new random projection matrix 420 is used). The result of this multiplication may then be output as a coordinate of the new vector $\vec{x}_{new}$.

Sparse dot product module 510 may also include reset 635. Reset 635 may be used to reset accumulator 615 when a new sparse dot product is to be calculated.

Figure 7:
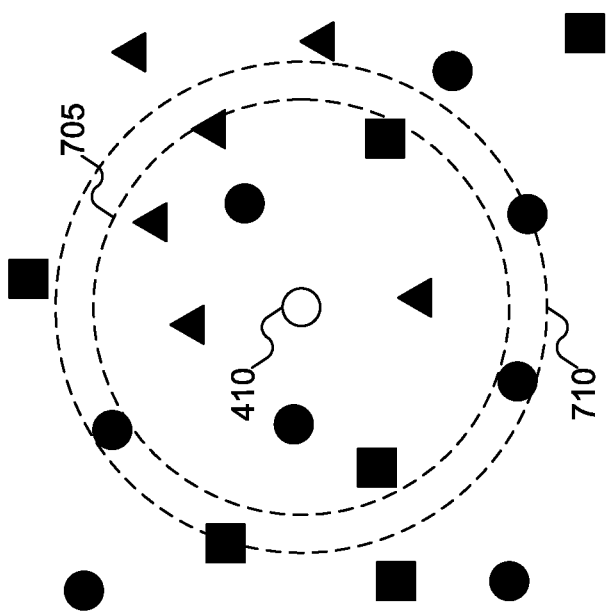
FIG. 7 shows an example nearest neighbors problem, according to embodiments of the disclosure.

FIG. 7 shows an example nearest neighbors problem, according to embodiments of the disclosure. In FIG. 7, query data point 410 is identified. Within a particular radius from query data point 410, various candidate data points near to query data point 410 may be identified. Each candidate data point near to query data point 410 may have some property, represented in FIG. 7 by the shapes of the data points. Thus, some candidate data points have the property "triangle", other candidate data points have the property "circle", and still other candidate data points have the property "square". Query data point 410 may then be associated with the property that is most common among the nearest neighbors to query data point 410. As may be seen in FIG. 7, there are a total of eight neighbors to query data point 410 within boundary 705: four candidate data points that have the property "triangle", and two candidate data points each that have the properties "square" and "circle". Thus, query data point 410 may be associated with the property "triangle".

Note that query data point 410 is associated with the property "triangle" if only the eight nearest neighbors are used. If 11 nearest neighbors were used, as shown by boundary 710, then there would be five candidate data points with the property "circle", four candidate data points with the property "triangle", and two candidate data points with the property "square". Thus, the property to be associated with a query data point may depend on how many nearest neighbors are considered.

Figure 8:
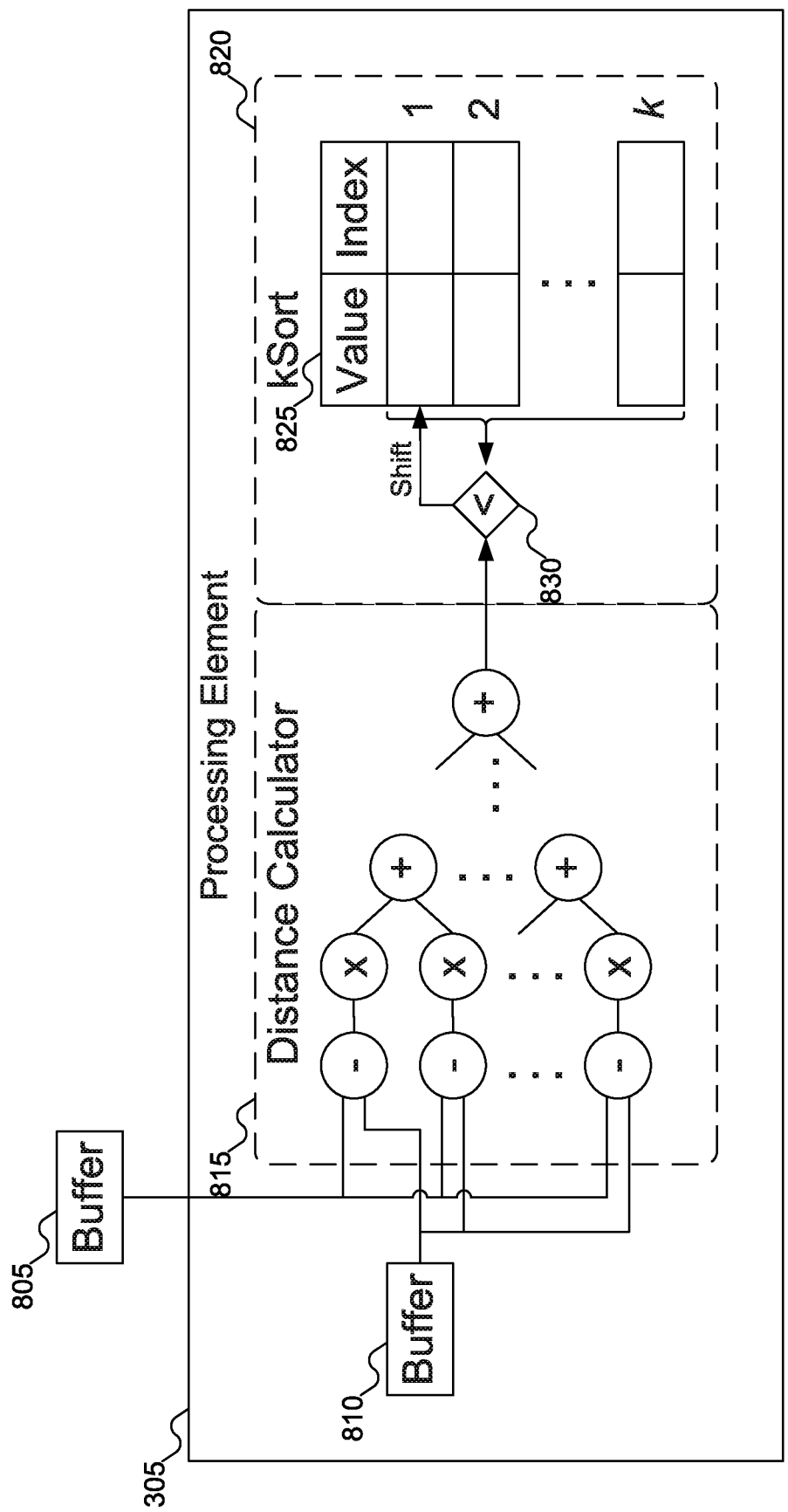
FIG. 8 shows details of the processing element of FIGS. 3A-3B, according to embodiments of the disclosure.

FIG. 8 shows details of processing element 305 of FIGS. 3A-3B, according to embodiments of the disclosure. In FIG. 8, buffers 805 and 810 may store information about query data point 410 of FIG. 4 and matrix 405 of FIG. 4, respectively. By storing this information in buffers, much like how the vector $\vec{x}$ and random projection matrix 420 of FIG. 4 may be stored in buffer 505 of FIG. 5 and/or equivalent buffers, data may be accessed multiple times and by multiple processing elements 305. From buffer 810, processing element 305 may access various candidate data points from matrix 405 of FIG. 4, to determine how near each candidate data point is to query data point 410 of FIG. 4. Note that buffers 805 and 810 may be combined into a single buffer, rather than being separate buffers, and that buffers 805 and 810 may both be inside processing element 305 or outside processing element 305. Note too that in some embodiments of the disclosure buffer 805 may be accessed by multiple processing elements 305, and therefore may include information about multiple query data points.

Once processing element 305 has accessed query data point 410 of FIG. 4 from buffer 805 and a candidate data point from matrix 405 of FIG. 4 from buffer 810, distance calculator may determine the distance between the two data points. Any desired distance function may be used.

One distance function that may be used is the Euclidean distance function. To determine the distance between points $a=(a_1, a_2, \ldots a_n)$ and $b=(b_1, b_2, \ldots b_n)$, the function $EDist(a, b)=\sqrt{(a_1-b_1)^2+(a_2-b_2)^2+\ldots+(a_n-b_n)^2}$ may be used to calculate the distance between points a and b. But note that this function determines the actual Euclidean distance between the data points. If the problem to be solved is a nearest neighbors problem, then the actual distance is not needed, provided that the actual function used returns the same relative order as the Euclidean distance function. The square of the Euclidean distance function, or $EDist'(a, b)=\sqrt{(a_1-b_1)^2+(a_2-b_2)^2+\ldots+(a_n-b_n)^2}$ is such a function, and avoids the square root operation. Thus, this modified Euclidean distance function may be used instead of the Euclidean distance function as well. Another distance function that may be used is the taxicab distance function. Named for the distance a taxicab would have to drive to deliver a passenger to his or her destination assuming a square grid of streets, the taxicab distance may be calculated as $TDist(a, b)=|a_1-b_1|+|a_2-b_2|+\ldots+|a_n-b_n|$ (where $|a_i-b_i|$ represents the absolute value of the difference $a_i-b_i$. The taxicab distance function provides a measure of distance that is intuitive, and while perhaps not as accurate as the Euclidean distance function is sufficient for the purposes of determining the nearest neighbors to query data point 410 of FIG. 4.

Distance calculator 815 is shown implementing the modified Euclidean distance function: corresponding coordinates from query data point 410 of FIG. 4 and a candidate data point in matrix 405 of FIG. 4 may be input to the various difference operators, which may calculate the difference between the input coordinates. These differences may be input to the multiplication operators to calculate the square of the difference. The various addition operators may then pairwise sum the squares of the differences, until a single value is determined as the distance between the data points. But embodiments of the disclosure may implement other distance functions as described above, with appropriate changes to the operators shown in distance calculator 815.

Once the distance between query data point 410 of FIG. 4 and a candidate data point in matrix 405 of FIG. 4 has been determined, kSort 820 may take over. kSort 820 may determine the k-nearest neighbors to query data point 410 of FIG. 4. To that end, kSort 820 may include storage (which may be any desired volatile or non-volatile storage) for the k-nearest neighbors of query data point 410 of FIG. 4. In FIG. 8, kSort 820 is shown as including list 825. Each entry in list 825 may include an index identifying a candidate data point in matrix 405 of FIG. 4 and a value representing the distance between that candidate data point in matrix 405 of FIG. 4 and query data point 410 of FIG. 4. In some embodiments of the disclosure, list 825 may be sorted, with the nearest neighbor to query data point 410 of FIG. 4 stored in the first entry of list 825, the second nearest neighbor to query data point 410 of FIG. 4 stored in the second entry of list 825, and so on. Note that list 825 may include k entries, which may represent the k-nearest neighbors: if a candidate data point that was stored in list 825 is determined not to be one of the k-nearest neighbors to query data point 410 of FIG. 4, that candidate data point may be removed from list 825.

After distance calculator 815 determines the distance between query data point 410 of FIG. 4 and a candidate data point in matrix 405 of FIG. 4, comparator 830 may compare this distance with the values in list 825. If list 825 is sorted, then comparator 830 may compare this distance with each value in list 825 until a value larger than this distance is found in list 825 or all entries in list 825 have been considered. If the current distance is larger than all values in list 825, then the current candidate data point is not one of the k-nearest neighbors of query data point 410 of FIG. 4, and the current candidate data point may be discarded. Otherwise, the farthest neighbor in list 825 may be removed from list 825, the entries may be shifted down appropriately to make room for the current distance, and the current distance and the index of the candidate data point in question may be inserted into list 825 at the appropriate entry. In effect, this operation is an insertion sort operation.

If list 825 is not sorted, then comparator 830 may identify the entry in list 825 that represents a candidate data point that is currently the furthest from query data point 410. (This farthest distance may be stored somewhere in kSort 820, or may be determined by examining the values in list 825.) Comparator 830 may then compare the current distance with this furthest distance in list 825. If the current distance is larger than the farthest distance in list 825, then the current candidate data point is not one of the k-nearest neighbors of query data point 410 of FIG. 4, and the current candidate data point may be discarded. Otherwise, the farthest neighbor in list 825 may be removed from list 825 and the current candidate data point may be added to list 825.

In some embodiments of the disclosure, query data point 410 of FIG. 4 may be part of matrix 405 of FIG. 4. In such embodiments, there are at least two possible variations to processing element 305. First, if query data point 410 of FIG. 4 is part of matrix 405 of FIG. 4, then it would seem redundant to include query data point 410 of FIG. 4 twice (once as query data point 410 of FIG. 4 in buffer 805, and once as part of matrix 405 of FIG. 4 in buffer 810). Thus, instead query data point 410 of FIG. 4 may be identified to processing element 305 using its index within matrix 405 of FIG. 4. Second, if query data point 410 of FIG. 4 is also in matrix 405 of FIG. 4 in buffer 810, then query data point 410 of FIG. 4 may be compared with itself by processing element 305. As may be expected, the distance between a data point and itself would likely be zero, and thus would be a "nearest neighbor" as determined by kSort 820. To address such possibilities, embodiments of the disclosure may check that the distance as calculated by distance calculator 815 is non-zero (to avoid considering query data point 410 of FIG. 4 as a neighbor of itself), or embodiments of the disclosure may include an extra entry in list 825 (which may be identified as entry zero) for query data point 410 of FIG. 4 as its own nearest neighbor.

While the above discussion focuses on list 825 as an array, embodiments of the disclosure may use any desired data structure. For example, list 825 may be implemented as a linked list, a hash table, or any other desired data structure. Embodiments of the disclosure are intended to include any such variations in the term "list".

By using distance calculator 815 and kSort 820, processing element 305 may provide a solution to the k-nearest neighbors problem. But embodiments of the disclosure may have processing element 305 solve other problems, by appropriate replacement of distance calculator 815 and kSort 820 with modules to solve the problem in question. In addition, other data may be stored in list 825; if other data is stored in list 825, then the data used to maintain list 825 as a sorted list may be other than the distance between query data point 410 of FIG. 4 and other candidate data points in matrix 405 of FIG. 4.

Figure 9:
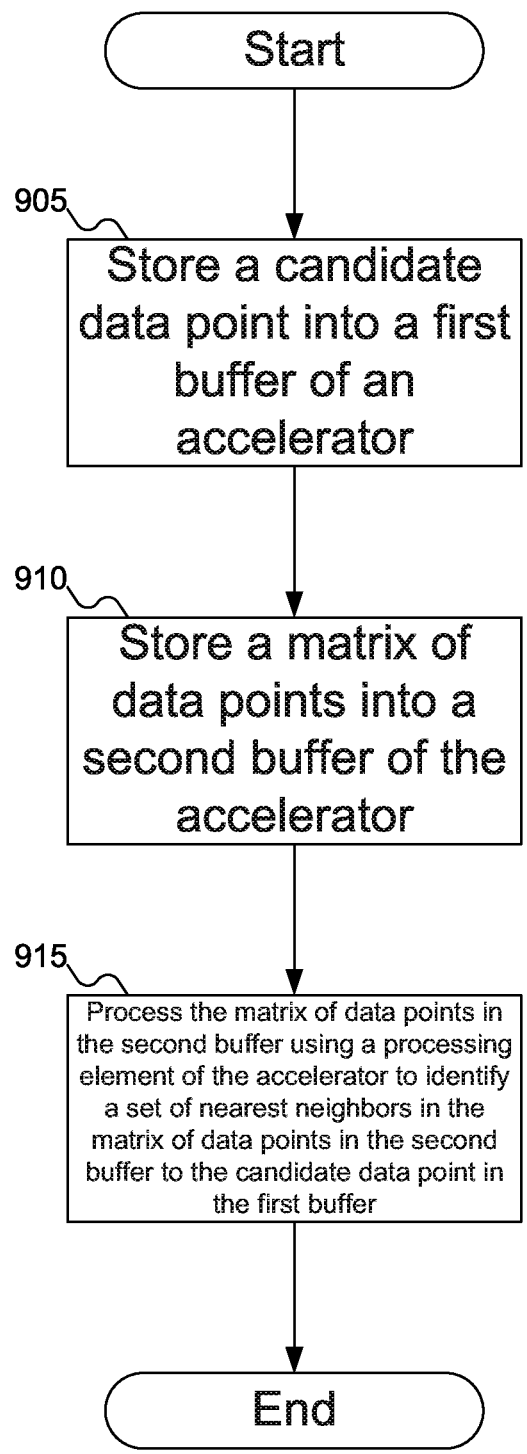
FIG. 9 shows a flowchart of an example procedure for solving the nearest neighbors problem using the processing element of FIGS. 3A-3B, according to embodiments of the disclosure.

FIG. 9 shows a flowchart of an example procedure for solving the nearest neighbors problem using processing element 305 of FIGS. 3A-3B, according to embodiments of the disclosure. In FIG. 9, at block 905, accelerator 135 of FIG. 1 may load query data point 410 of FIG. 4 into buffer 805 of FIG. 8. query data point 410 of FIG. 4 may be loaded into buffer 805 of FIG. 8, and may be loaded from storage device 120 of FIG. 1, memory 115 of FIG. 1, memory 315 of FIGS. 3A-3B, as output from another component, from a buffer in another component, or from any other desired source.

At block 910, accelerator 135 of FIG. 1 may load matrix 405 of FIG. 4 into buffer 810 of FIG. 8. Matrix 405 of FIG. 4 may be loaded into buffer 810 of FIG. 8, and may be loaded from storage device 120 of FIG. 1, memory 115 of FIG. 1, memory 315 of FIGS. 3A-3B, as output from another component, from a buffer in another component, or from any other desired source.

Finally, at block 915, processing element 305 of FIGS. 3A-3B may process query data point 410 of FIG. 4 from buffer 805 of FIG. 8 and matrix 405 of FIG. 4 from buffer 810 of FIG. 8 to identify the k-nearest neighbors of query data point 410 of FIG. 4 in matrix 405 of FIG. 4.

Figure 10:
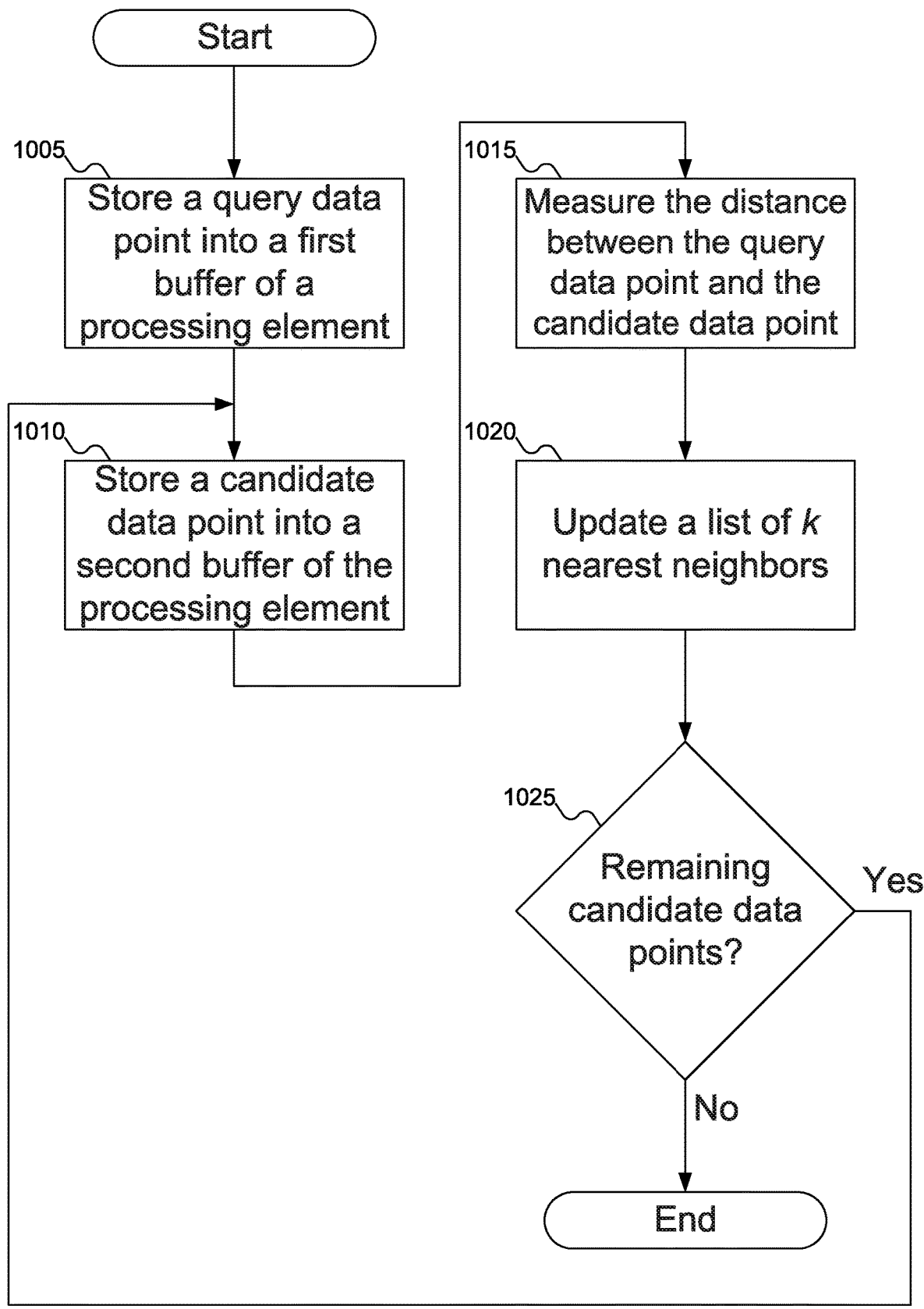
FIG. 10 shows an alternate flowchart of an example procedure for solving the nearest neighbors problem using processing element 305 of FIGS. 3A-3B, according to embodiments of the disclosure.

FIG. 10 shows an alternate flowchart of an example procedure for solving the nearest neighbors problem using processing element 305 of FIGS. 3A-3B, according to embodiments of the disclosure. In FIG. 10, at block 1005, query data point 410 of FIG. 4 may be loaded into buffer 805 of FIG. 8. At block 1010, a candidate data point from matrix 405 of FIG. 4 may be loaded into buffer 810 of FIG. 8. At block 1015, distance calculator 815 of FIG. 8 may measure the distance between query data point 410 of FIG. 4 and the candidate data point. At block 1020, kSort 820 of FIG. 8 may update list 825 of FIG. 8 with the k-nearest neighbors of query data point 410 of FIG. 4, if the candidate data point is one of the k-nearest neighbors. Finally, at block 1025, processing element 305 of FIG. 3 may determine whether there are other candidate data points in matrix 405 of FIG. 4 to consider. If so, then processing may return to block 1010 to load another candidate data point; otherwise, processing is complete.

Figure 11:
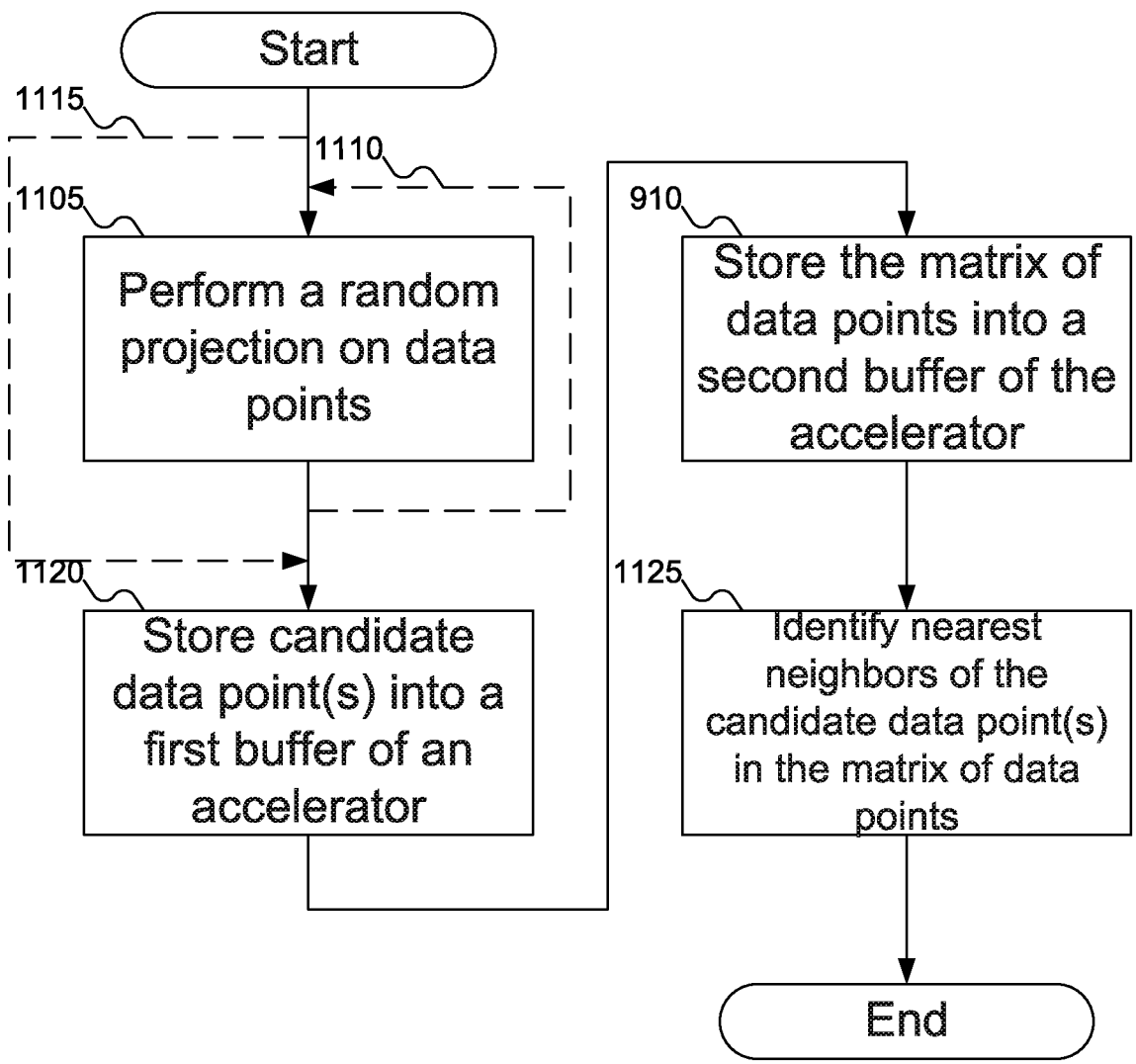
FIG. 11 shows yet another alternative flowchart of an example procedure for solving the nearest neighbors problem using the processing element of FIGS. 3A-3B, according to embodiments of the disclosure.

FIG. 11 shows yet another alternative flowchart of an example procedure for solving the nearest neighbors problem using processing element 305 of FIGS. 3A-3B, according to embodiments of the disclosure. In FIG. 11 and in other figures below, blocks may use the same identifiers as blocks in earlier figures when the operations described are the same. In FIG. 11, at block 1105, random projection module 310 of FIGS. 3A-3B may perform a random projection of data points to reduce the dimensionality of the data points. Depending on the number of data points, block 1105 may be performed more than once (as shown by dashed line 1110). Further, if the data points have an acceptable dimensionality, block 1105 may be skipped, as shown by dashed line 1115.

At block 1120, accelerator 135 of FIG. 1 may load query data point 410 of FIG. 4. Query data point 410 of FIG. 4 may be loaded into buffer 805 of FIG. 8, and may be loaded from storage device 120 of FIG. 1, memory 115 of FIG. 1, memory 315 of FIGS. 3A-3B, as output from another component, from a buffer in another component, or from any other desired source.

At block 910, accelerator 135 of FIG. 1 may load matrix 405 of FIG. 4. Matrix 405 of FIG. 4 may be loaded into buffer 810 of FIG. 8, and may be loaded from storage device 120 of FIG. 1, memory 115 of FIG. 1, memory 315 of FIGS. 3A-3B, as output from another component, from a buffer in another component, or from any other desired source.

Finally, at block 1125, processing element 305 of FIGS. 3A-3B may solve the problem of identifying the k-nearest neighbors to query data point 410 of FIG. 4 in buffer 805 of FIG. 8 from matrix 405 of FIG. 4 in buffer 810 of FIG. 8.

Figure 12:
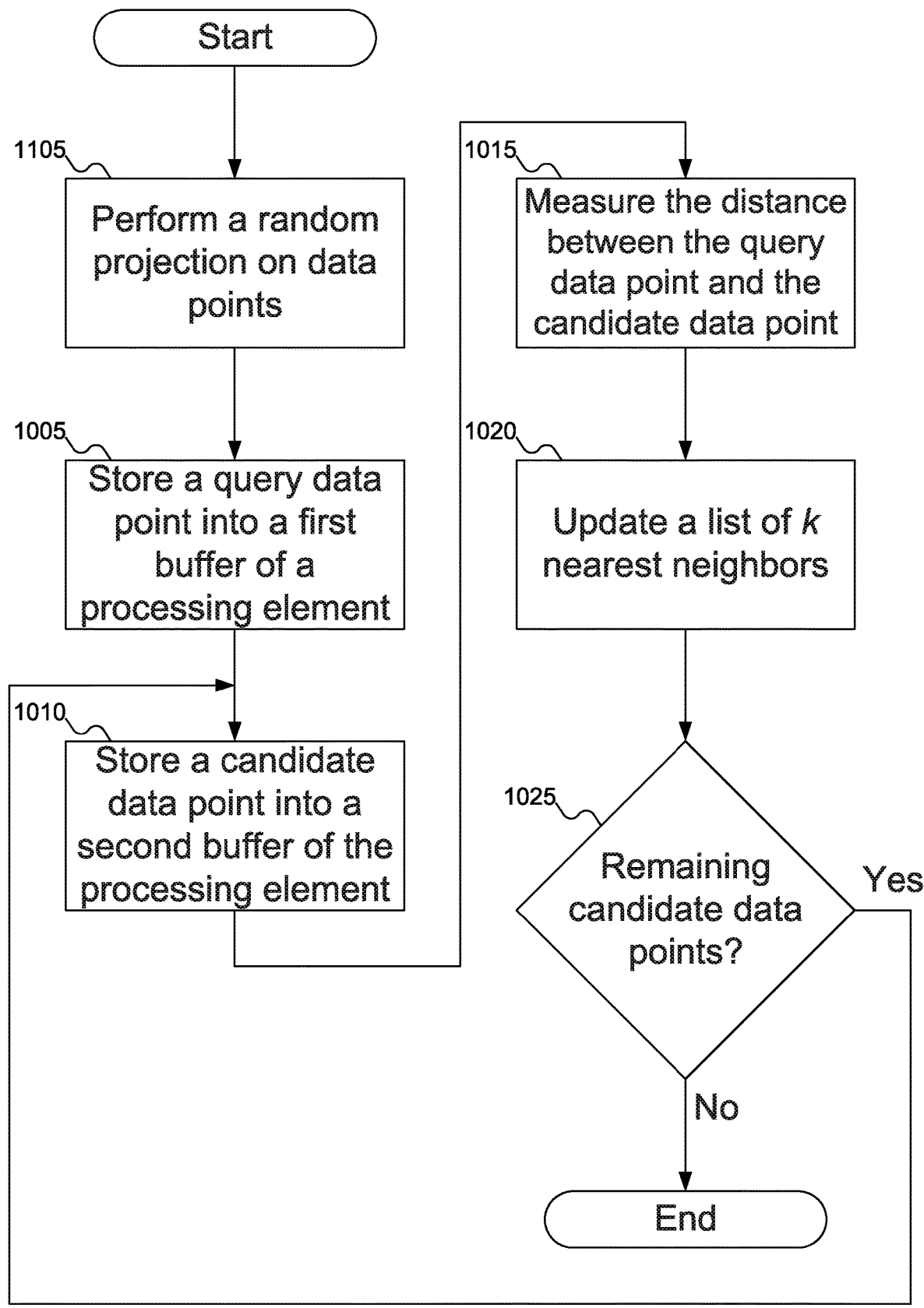
FIG. 12 shows yet another alternate flowchart of an example procedure for solving the nearest neighbors problem using processing element 305 of FIGS. 3A-3B, according to embodiments of the disclosure.

FIG. 12 shows an alternate flowchart of an example procedure for solving the nearest neighbors problem using processing element 305 of FIGS. 3A-3B, according to embodiments of the disclosure. In FIG. 12, at block 1105, random projection module 310 of FIGS. 3A-3B may perform a random projection of data points to reduce the dimensionality of the data points. This dimensionality reduction may be performed one data point at a time, or for all data points at one time. At block 1005, query data point 410 of FIG. 4 may be loaded into buffer 805 of FIG. 8. At block 1010, a candidate data point from matrix 405 of FIG. 4 may be loaded into buffer 810 of FIG. 8. At block 1015, distance calculator 815 of FIG. 8 may measure the distance between query data point 410 of FIG. 4 and the candidate data point. At block 1020, kSort 820 of FIG. 8 may update list 825 of FIG. 8 with the k-nearest neighbors of query data point 410 of FIG. 4, if the candidate data point is one of the k-nearest neighbors. Finally, at block 1025, processing element 305 of FIG. 3 may determine whether there are other candidate data points in matrix 405 of FIG. 4 to consider. If so, then processing may return to block 1010 to load another candidate data point; otherwise, processing is complete.

Figure 13:
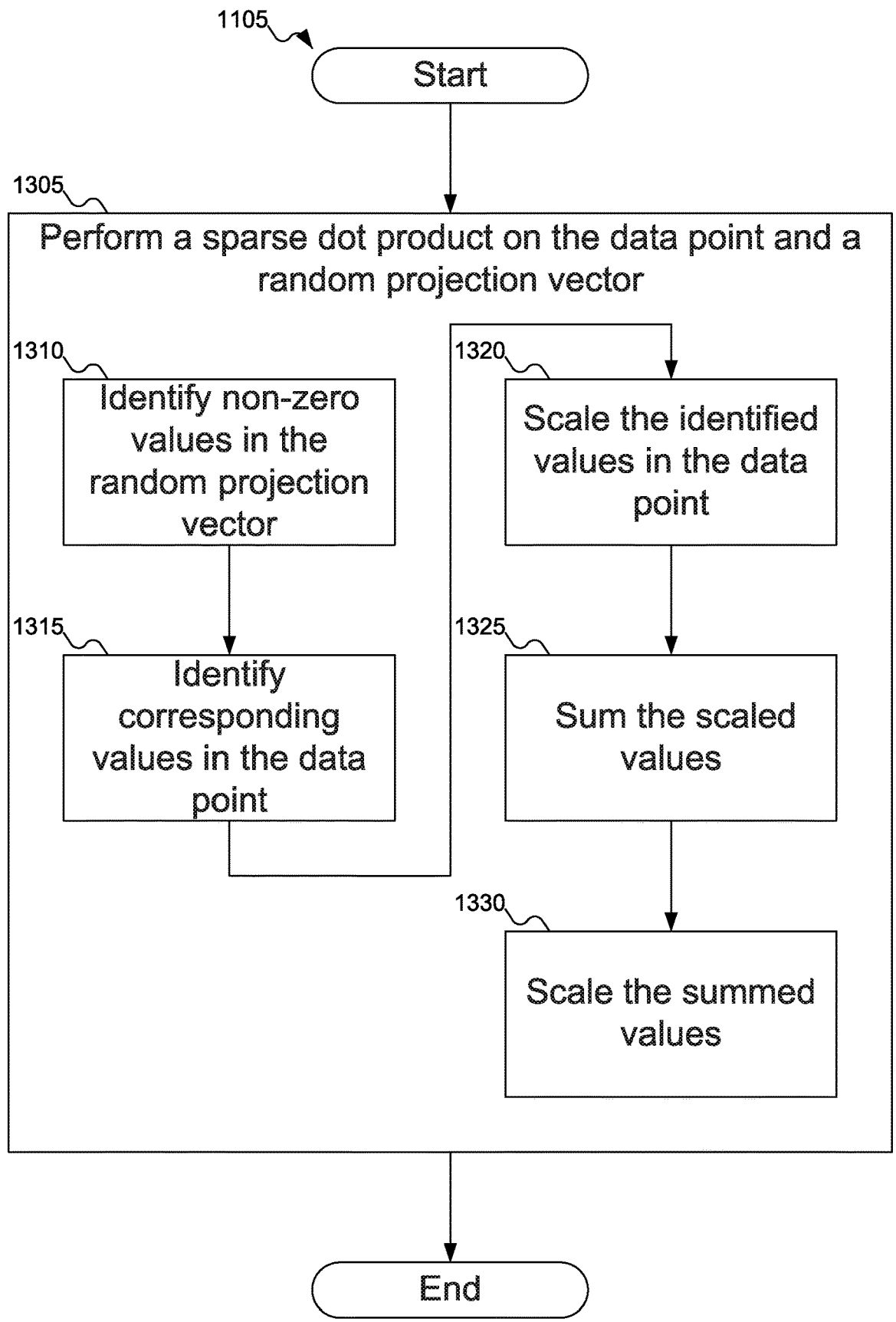
FIG. 13 shows a flowchart of an example procedure to perform a sparse dot product using the sparse dot product module of FIG. 6, according to embodiments of the disclosure.

FIG. 13 shows a flowchart of an example procedure to perform a sparse dot product using sparse dot product module 510 of FIG. 6, according to embodiments of the disclosure. In FIG. 13, at block 1305, random projection module 310 of FIGS. 3A-3B (more specifically, sparse dot product modules 510 of FIG. 5) may perform a sparse dot product on a data point in matrix 405 of FIG. 4 and a random projection vector from random projection matrix 420 of FIG. 4. To perform a sparse dot product, at block 1310 sparse dot product module 510 of FIG. 5 may identify non-zero values in the random projection vector. At block 1315, sparse dot product module 510 of FIG. 5 may use these non-zero values to identify corresponding values in the data point in matrix 405 of FIG. 4. At block 1320, sparse dot product module 510 of FIG. 5 may scale the identified values (by changing the sign of the value as appropriate and/or multiplying by the value in the random projection vector), and at block 1325 sparse dot product module 510 of FIG. 5 may sum the scaled values in accumulator 615 of FIG. 6. Note that if the values from the data point in matrix 405 of FIG. 4 only have the sign changed as appropriate and not by multiplying by the value in the random projection vector, then at block 1330 sparse dot product module 510 of FIG. 5 may scale the accumulated sum by a factor, such as $$\sqrt{\frac{s}{l}};$$

if the value from the data point in matrix 405 of FIG. 4 is multiplied by the value from the random projection vector, then block 1330 may be omitted.

Note that blocks 1320 and 1330 both use the verb "scale". In the context of FIG. 13, "scaling" is intended to mean multiplying by some constant. Multiplying by −1, as might occur in block 1320, is an example of a particular value used to scale the input: in general, any value may be used to scale the input. It may be expected that, whatever the value used to scale the input may be used consistently. For example, in block 1320, values that are selected for scaling may be multiplied by −1 or $$\pm\sqrt{\frac{s}{l}},$$

depending on embodiments of the disclosure. Note too that multiplication by +1 may be considered scaling as well, although as +1 is the multiplicative identity, scaling by +1 may be omitted without any consequences. Note that only some values might be scaled, depending on embodiments of the disclosure: as discussed above with reference to FIG. 5, if values in random projection matrix 420 of FIG. 4 are limited to ±1 or $$\pm\sqrt{\frac{s}{l}},$$

scaling in block 1320 might be limited to multiplication by $$\pm\sqrt{\frac{s}{l}}$$

(and block 1330 might be omitted), or scaling in block 1320 might be limited to multiplication by −1 (and block 1330 might be limited to scaling by $$\sqrt{\frac{s}{l}}).$$

Figure 14:
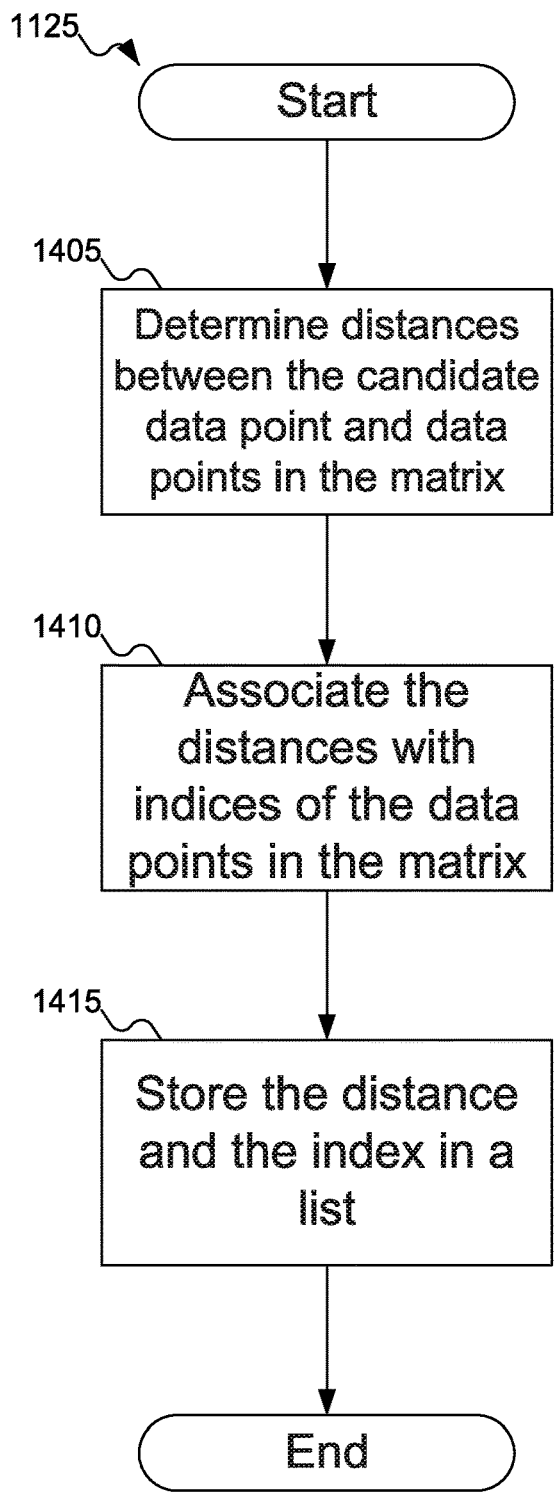
FIG. 14 shows a flowchart of an example procedure for identifying the nearest neighbors to a query data point using the processing element of FIGS. 3A-3B, according to embodiments of the disclosure.

FIG. 14 shows a flowchart of an example procedure for identifying the nearest neighbors to query data point 410 of FIG. 4 using processing element 305 of FIGS. 3A-3B, according to embodiments of the disclosure. In FIG. 14, at block 1405, distance calculator 815 of FIG. 8 may determine distances between query data point 410 of FIG. 4 and candidate data points in matrix 405 of FIG. 4. At block 1410, processing element 305 of FIGS. 3A-3B may associate these distances with identifiers of the candidate data points in matrix 405 of FIG. 4. Finally, at block 1415, kSort 820 of FIG. 8 may store the distances and the indices in list 825 of FIG. 8. Note that if kSort 820 of FIG. 8 stores list 825 of FIG. 8 sorted by distance from query data point 410 of FIG. 4, then block 1415 may also include updating list 825 of FIG. 8 to keep list 825 of FIG. 8 sorted by distance from query data point 410 of FIG. 4.

Figure 15:
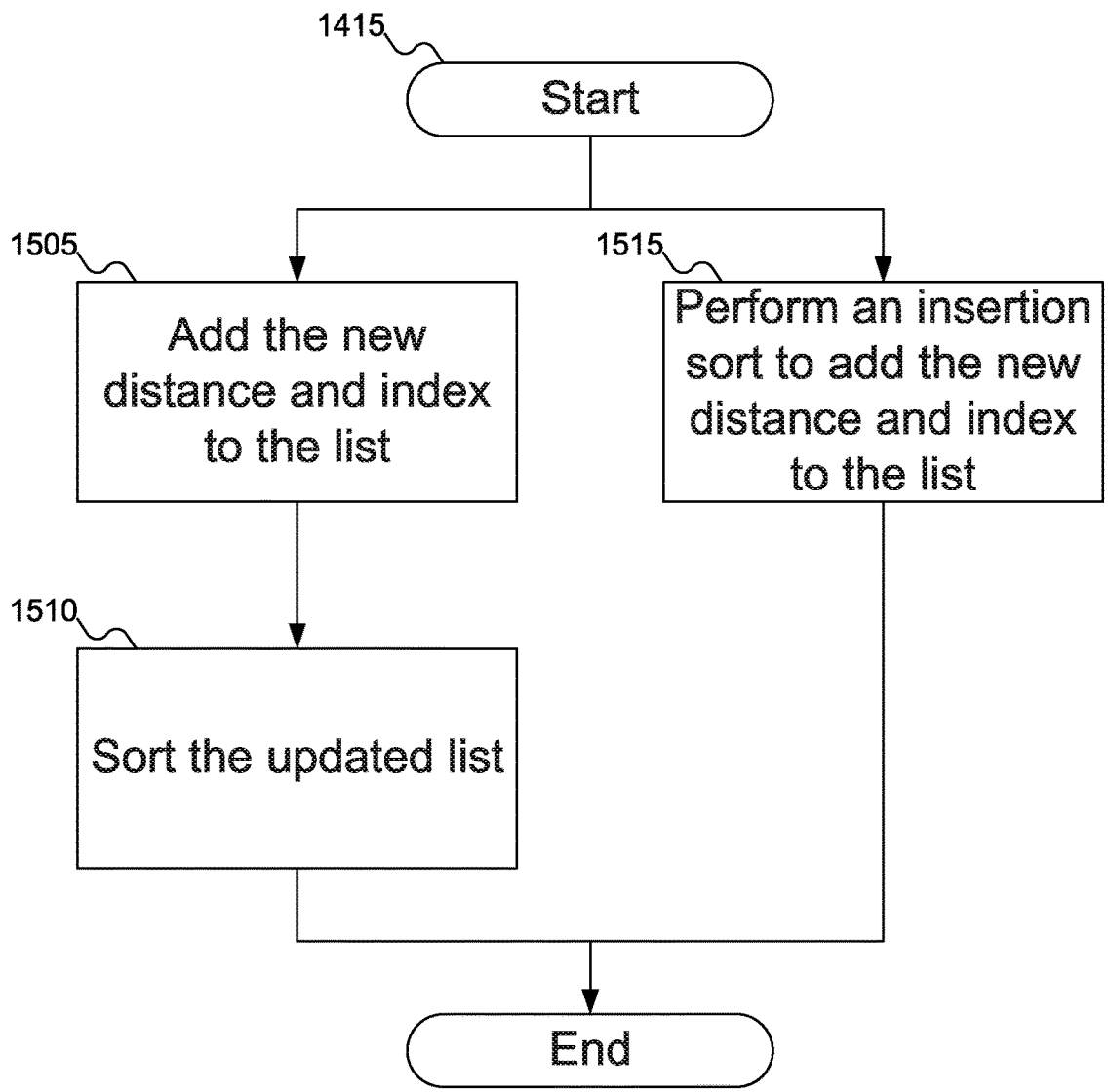
FIG. 15 shows a flowchart of an example procedure to build a sorted list of nearest neighbors to a query data point using the kSort of FIG. 8, according to embodiments of the disclosure.

FIG. 15 shows a flowchart of an example procedure to build a sorted list of nearest neighbors to query data point 410 of FIG. 4 using kSort 820 of FIG. 8, according to embodiments of the disclosure. In FIG. 15, at block 1505, kSort 820 of FIG. 8 may add a new distance and associated index to list 825 of FIG. 8, and at block 1510, kSort 820 of FIG. 8 may sort the updated list. Alternatively, at block 1515, kSort 820 of FIG. 8 may perform an insertion sort to add the new distance and associated index to list 825 of FIG. 8, producing an updated sorted list.

Figure 16:
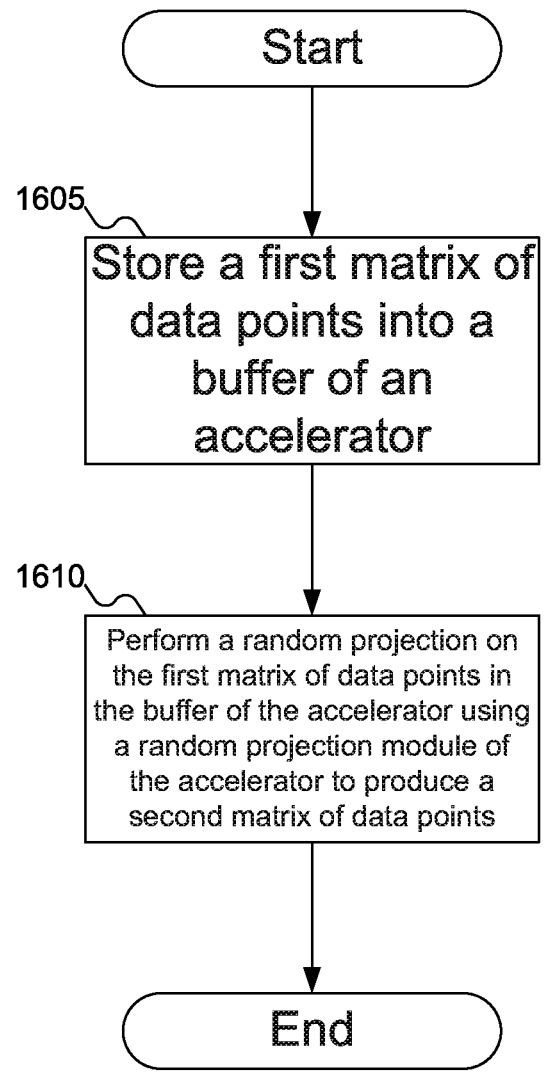
FIG. 16 shows a flowchart of an example procedure for reducing data dimensionality using the random projection module of FIGS. 3A-3B, according to embodiments of the disclosure.

FIG. 16 shows a flowchart of an example procedure for reducing data dimensionality using random projection module 310 of FIGS. 3A-3B, according to embodiments of the disclosure. In FIG. 16, at block 1605, accelerator 135 of FIG. 1 may load matrix 405 of FIG. 4 into buffer 505 of FIG. 5. At block 1610, random projection module 310 of FIGS. 3A-3B may then perform a random projection on data points in matrix 405 of FIG. 4 to produce matrix 430 of FIG. 4 of data points: matrix 430 of FIG. 4 may have a reduced dimensionality when compared with matrix 405 of FIG. 4.

Figure 17:
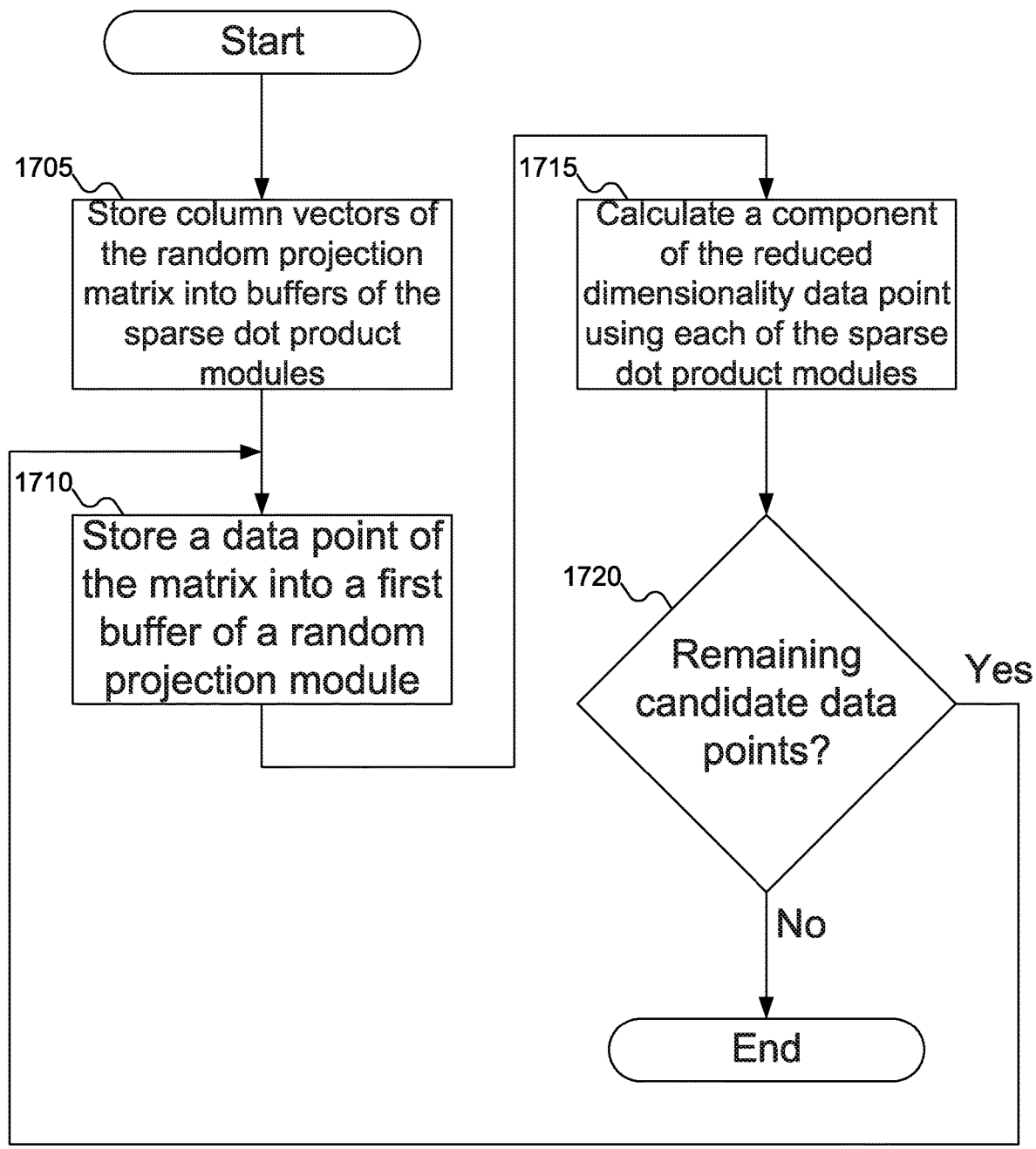
FIG. 17 shows an alternative flowchart of an example procedure for reducing data dimensionality using random projection module 310 of FIGS. 3A-3B, according to embodiments of the disclosure.

FIG. 17 shows an alternative flowchart of an example procedure for reducing data dimensionality using random projection module 310 of FIGS. 3A-3B, according to embodiments of the disclosure. In FIG. 17, at block 1705, column vectors of random projection matrix 420 of FIG. 4 may be loaded into buffers 620 of FIG. 6 of sparse dot product modules 510 of FIG. 5. At block 1710, a data point of matrix 405 of FIG. 4 may be loaded into buffer 505 of random projection module 310 of FIG. 3. At block 1715, sparse dot product modules 510 of FIG. 5 may each calculate a coordinate of the reduced dimensionality data point 435 of FIG. 4. Finally, at block 1720, random projection module 310 of FIG. 3 may determine whether there are other data points in matrix 405 of FIG. 4 to have their dimensionality reduced. If so, then processing may return to block 1710 to load another data point; otherwise, processing is complete.

Figure 18:
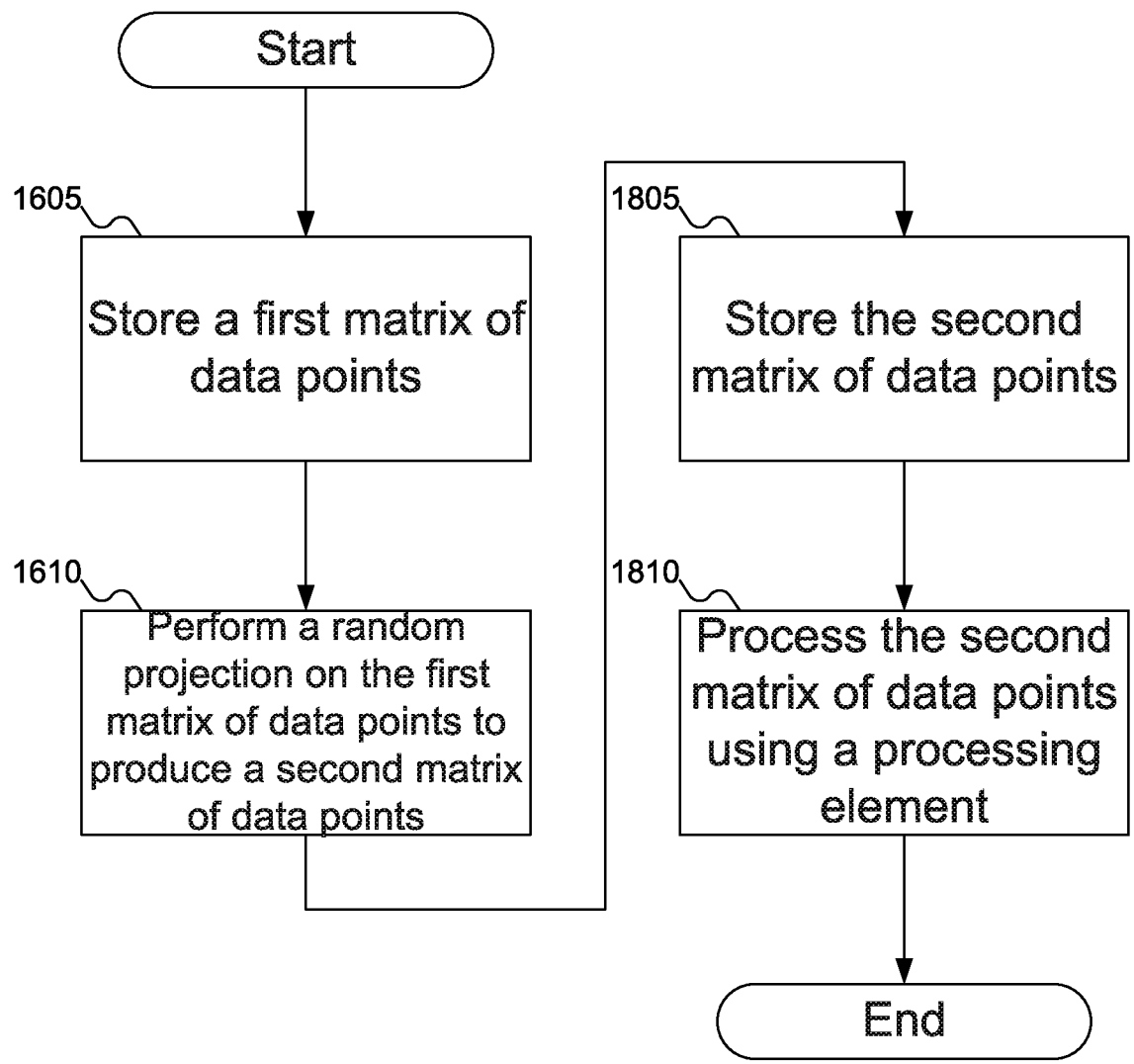
FIG. 18 shows yet another alternative flowchart of an example procedure for reducing data dimensionality using the random projection module of FIGS. 3A-3B, according to embodiments of the disclosure.

FIG. 18 shows yet another alternative flowchart of an example procedure for reducing data dimensionality using random projection module 310 of FIGS. 3A-3B, according to embodiments of the disclosure. In FIG. 18, at block 1605, accelerator 135 of FIG. 1 may load matrix 405 of FIG. 4 into buffer 505 of FIG. 5. At block 1610, random projection module 310 of FIGS. 3A-3B may then perform a random projection on data points in matrix 405 of FIG. 4 to produce matrix 430 of FIG. 4 of data points: matrix 430 of FIG. 4 may have a reduced dimensionality when compared with matrix 405 of FIG. 4. At block 1805, accelerator 135 of FIG. 1 may store matrix 430 of FIG. 4. This storage may be in a buffer, such as buffer 505 of FIG. 5 or buffer 810 of FIG. 8, storage device 120 of FIG. 1, memory 315 of FIG. 3, or memory 115 of FIG. 1, among other possibilities. Finally, at block 1810, processing element 305 of FIGS. 3A-3B may process matrix 430 of FIG. 4, as described above.

In FIGS. 9-18, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure include an accelerator for reducing the dimensionality of data points for later processing. By reducing the dimensionality of the data points, data points may be compared more efficiently, potentially requiring fewer calculations, and providing a technical advantage. Such processing may include, for example, identifying the k-nearest neighbors of a specific data point.

Embodiments of the disclosure may include using a sparse random projection vector or a sparse random projection matrix. By using a sparse random projection vector or sparse random projection matrix, zero elements may be identified and calculations involving those zero elements may be avoided. Since the random projection vector or random projection matrix may be sparse, there may be relatively few non-zero values, enabling reducing data dimensionality more efficiently, potentially requiring fewer calculations, and providing a technical advantage.

Embodiments of the disclosure may include near-storage acceleration, using accelerator 135 of FIG. 1, of the dimensionality-reduced machine learning algorithms, and some embodiments may include a framework for accelerating a nearest neighbors (kNN) algorithm on field programable gate arrays (FPGAs). Random Projections are a technique for large-scale dimensionality reduction in machine learning applications. Some embodiments of the disclosure may feature a Random Projections k-nearest neighbors (RPkNN) framework which may include two compute modules implementing an architecture based on Random Projection and the kNN algorithm and a host program facilitating easy integrating of the compute modules in the existing applications.

Embodiments of the present disclosure may solve an ever-increasing demand for computing resources and memory bandwidth from the curse of dimensionality. Furthermore, some embodiments may prevent a slow-down to process large datasets.

In some embodiments, RPkNN also may utilize a new buffering scheme tailored to Random Projection and the kNN algorithm. The architecture may enable parallel kNN computations and the reuse of the compressed and low-dimension data utilizing the near-storage structure of Computation Storage Devices (CSDs). In some embodiments of the disclosure, an RPkNN implemented on a Solid-State Drive (SSD) CSD may exceed a scikit-learn implemented on a CPU.

In embodiments of the disclosure, an k-nearest neighbors (kNN) algorithm may be used for many applications, including similarity search, database query, image classification, bioinformatics, or as a data mining algorithm. Embodiments of the disclosure may enable implementation of an algorithm-tailored datapath and buffering scheme and may overcome existing CPU- and GPU-based solutions to compute kNN.

In some embodiments of the disclosure, a FPGA may offer fine-grained on-chip resources, which may enable implementing a custom buffering scheme tailored to the kNN algorithm to store input data and intermediate results efficiently. In some embodiments of the disclosure, the reconfigurability of an FPGA may also may enable implementing fine-granularity temporal/pipeline parallelism to address the complex loop-carried data dependencies to improve overall performance.

Embodiments of the disclosure may include accelerating the kNN algorithm on FPGAs using accelerator 135 of FIG. 1. In some embodiments of the disclosure, the approximate kNN method may impose an overhead for decoding and requires off-chip memory access for large codebooks. In some embodiments of the disclosure, the compression method may not be general and may only apply to a few specific datasets. In some embodiments of the disclosure, the work may use Principal Component Analysis (PCA) for the dimensionality reduction. In some embodiments, this work may implement the PCA kernel on the FPGA.

Embodiments of the disclosure propose RPkNN, a framework for accelerating the kNN algorithm on FPGAs using accelerator 135 of FIG. 1. In some embodiments, the proposed RPkNN framework may include FPGA kernels implementing a throughput-optimized hardware architecture based on Random Projection and the kNN algorithm and a host program implementing pre-processing functions for converting input datasets to a format tailored for the proposed architecture. The end-to-end framework may offer seamless integration of the compute modules in legacy codes to accelerate the existing applications.

In some embodiments, Random Projection may be offered using random projection module 310 of FIGS. 3A-3B to reduce the dimension of data points to address the curse of dimensionality and reduce the memory bandwidth utilization and computations while maintaining reasonable accuracy. In some embodiments of the disclosure, SSD CSD may be utilized to reduces the input/output (I/O) bandwidth burden on a host CPU by directly accessing the dataset on the embedded SSD.

In some embodiments of the disclosure, an end-to-end framework for accelerating the kNN algorithm on FPGAs may be implemented, consisting of deeply pipelined FPGA kernels and pre-processing functions in the host program to enable easy integration of the framework in the existing applications.

In some embodiments of the disclosure, a new buffering scheme tailored to Random Projection and the kNN algorithm may reduce off-chip memory access.

In some embodiments of the disclosure, the architecture may enable parallel kNN computations with negligible performance and memory bandwidth overhead.

In some embodiments of the disclosure, the near-storage features of CSDs may reuse the compressed and low-dimension data.

In some embodiments of the disclosure, the architecture may be parameterized and scalable to be implemented on arbitrary FPGA devices.

In some embodiments of the disclosure, the performance and energy efficiency of RPkNN implemented on an SSD may be evaluated and compared with the kNN implementation of scikit-learn, a library for machine learning, running on a CPU. In some embodiments of the disclosure, the RPkNN solution may have higher performance across different dimensions per a single kNN computation than the CPU implementation for a database using scale-invariant feature transforms and a database using Spatial Envelopes, respectively.

In some embodiments of the disclosure, a dataset consists of N data points where each data point may be represented by a D-dimension vector. The kNN algorithm may consist of two major steps: distance calculation and top-k sorting. In the distance calculation step, the distance between a query data point and all other data points in the dataset (query data points) may be calculated with the computation and data access complexity of O(N×D). The top-k sorting step may select top-k smallest distances calculated in the previous step and may return the indices of the corresponding query data points. In some embodiments of the disclosure, the complexity may linearly increase with the dimension of the vectors.

In some embodiments of the disclosure, for high-dimensional data (e.g., with the number of dimensions more than 10), dimension reduction may be performed prior to applying the kNN algorithm and may avoid the effects of the curse of dimensionality and may reduce the data access and computational complexity. In some embodiments of the disclosure, Random Projection module 310 of FIGS. 3A-3B may be used, which may have advantages over analytical methods, such as PCA, since randomness may obtain high-quality approximations while avoiding unnecessary computational complexity.

In Random Projection, the original D-dimensional data are projected to a lower L-dimensional space by multiplying the original dataset by a randomly generated matrix RD×L:

$$X_{N \times L}^{new} = X_{N \times D} \times R_{D \times L} \quad (1)$$

According to a Johnson-Lindenstrauss lemma, random mappings may preserve the Euclidean distances of data points in the original high-dimensional space. In some embodiments of the disclosure, to enable this feature, the elements of R may be independent and identically distributed (i.i.d) with zero mean. An element of R at row i and column j ($r_{ij}$) may have the following distribution:

$$r_{ij} = \sqrt{\frac{S}{L}} \begin{cases} 1 & w.p. \quad 1/(2S) \\ 0 & w.p. \quad 1 - 1/S \\ -1 & w.p. \quad 1/(2S) \end{cases} \quad (2)$$

where parameter S controls the sparsity and accuracy trade-off of the projection.

In some embodiments of the disclosure, the kNN algorithm may be accelerated on FPGAs. Embodiments of the disclosure may include a method for Product Quantization (PQ) based approximated nearest neighbor search (ANN) in high dimensional spaces using a codebook of coarse and quantizer. In some embodiments of the disclosure, off-chip memory access may be used to store large codebooks.

In some embodiments of the disclosure, a near-storage accelerator, such as accelerator 135 of FIG. 1, that may take advantage of the high internal bandwidth of SSD may implement multiple pipelines of an application-optimized, wire-speed compression algorithm that may handle full storage bandwidth. In some embodiments of the disclosure, the application-specific optimizations may only apply to a specific set of datasets and are not general.

In some embodiments of the disclosure, a high-level synthesis-based kNN accelerator with optimized off-chip memory access on FPGAs with multiple DRAM or HBM (high-bandwidth memory) banks may be used. In some embodiments of the disclosure, the scalability of the architecture may be limited to the number of off-chip memory channels (typically one or two).

In some embodiments of the disclosure, Random Projection may be used for dimensionality reduction on FPGAs, via random projection module 310 of FIGS. 3A-3B. In some embodiments of the disclosure, Random Projection algorithms on FPGAs may show high performance and efficiency of the hardware implementation. In some embodiments of the disclosure, the implementation may generate a random matrix using a Linear Feedback Shift Register (LFSR). In some embodiments of the disclosure, low-precision data representation may be employed and may use principal component analysis based filtering to reduce off-chip memory accesses.

In some embodiments of the present disclosure, a RPkNN framework may consist of the FPGA kernels and the host program running on the CPU. The kernel code implemented on the FPGA accelerator 135 of FIG. 1 may perform computationally intensive tasks. On the host side, an API may support offloading the computations kNN algorithm to the FPGA and receiving the outputs. In some embodiments of the disclosure, direct PCIe peer-to-peer (P2P) transfers may be utilized from Non-volatile Memory Express (NVMe) SSD to Double-data rate FPGA (FPGA-DDR) to access the uncompressed data. In some embodiments of the disclosure, FPGA DRAM may be used to buffer low-dimensional and compressed data. In some embodiments of the disclosure, the two main kernels on the FPGA may be a Random Projection Module (RPM) and a kNN Module (kNNM).

According to Equation 1, Random Projection may involve a sparse matrix-vector multiplication (SpMV) between the random matrix R and each data point's vector x. The SpMV may consist of L dot-product operations between a sparse row of matrix R and D-dimensional vector x. In some embodiments of the disclosure, to increase the throughput, L sparse dot-product (SpDot) unit may work in parallel to produce all L elements of the output vector concurrently. In some embodiments of the disclosure, vector x may be stored in a buffer memory unit and may be reused among SpDot units to reduce off-chip memory access.

In some embodiments of the disclosure, since matrix R may be sparse, compressed sparse row (CSR) format may be used to represent it. In some embodiments of the disclosure, the CSR format may store a sparse matrix using three arrays V, COL INDEX, and ROW PTR representing nonzero values, column index of nonzero elements, and the pointer to the first nonzero element in each row of matrix R, respectively. According to Equation 2, the elements of the matrix R may consist of only three values: one zero value and two complement nonzero values. Therefore, in some embodiments of the disclosure, binary values in array V may be used, where 0 and 1 represent the positive and negative nonzero values, respectively. This may lead to a very lightweight communication and efficient implementation of the SpDot unit.

The kNNM architecture may include a buffer memory unit and multiple Processing Elements (PEs) 305 of FIGS. 3A-3B. In some embodiments of the disclosure, the framework may enable parallel kNN queries for multiple data points supported by the proposed hardware architecture and buffering scheme with no to negligible overhead on the memory bandwidth or the overall performance compared to a single kNN query. In some embodiments of the disclosure, the number of PEs(P) may be equal to the number of parallel queries. kNNM may first load the P query vectors from DRAM and send each of them to a PE. Then, kNNM may iterate over all vectors in the dataset, may store each query vector in the buffer memory unit, and may reuse it among all PEs. Since the overall data access complexity is O(N×D), embodiments of this disclosure may reduce the complexity of each data point query to O(N×D/P).

In some embodiments of the disclosure, each PE 305 of FIGS. 3A-3B may perform the kNN algorithm on a given query vector. Since in the top-k sorting step, the Euclidean distances may be compared, the square root operation may be avoided without compromising the accuracy. Therefore, the distance calculation (DistCal) unit may calculate the distance between two vectors V1 and V2 as $(V1(1)-V2(1))^2 + \ldots + (V1(D)-V2(D))^2$ in parallel as a fully unrolled loop implemented by D parallel subtractor and multiplier followed by an addition tree. Since the DistCal unit may require D parallel access to the on-chip memory units of query and query vectors from buffer units, full loop unrolling may involve LUTRAM resources for large D values exceeding the available on-chip resources. In these cases, the loop may be partially unrolled to limit the number of memory replications.

In some embodiments of the disclosure, the top-k sorting (kSort) unit may use two k-element shift registers to keep track of the indices and distance values of the most recent k-nearest query vectors (neighbors) in the ascending order of the distance values. When a new distance value is computed in the DistCal unit, it may be compared with the registered distance values starting from element 0 to k one by one. If the current distance value is smaller than the current register value, current elements of both registers may be shifted to right starting the current location, and the index and the distance of the current location may be updated with new values.

In some embodiments of the disclosure, the RPkNN may be compared with the optimized kNN implementation of the scikit-learn library running on a CPU. In some embodiments of the disclosure, the performance of the CPU implementation may be evaluated on a CPU. In some embodiments of the disclosure, the work may be evaluated on an SSD CSD.

Embodiments of the disclosure present RPkNN, a FPGA implementation of the dimensionality-reduced kNN Algorithm using Random Projection. In some embodiments of the disclosure, RPkNN may include deeply pipelined and scalable FPGA kernels and a host program implementing pre-processing functions to con-vert the raw datasets into the appropriate format needed for the framework. In some embodiments of the disclosure, the experimental results based on SSD for accelerating the kNN algorithm on two datasets for evaluating ANN methods may show on average one order of magnitude higher performance compared to the state-of-the-art on CPU implementation.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes an device, comprising:
   a first buffer to store a query data point;
   a second buffer to store a matrix of candidate data points; and
   a processing element to identify a set of nearest neighbors to the query data point in the first buffer from the matrix of candidate data points in the second buffer.

Statement 2. An embodiment of the disclosure includes the device according to statement 1, wherein:
   the first buffer is configured to store at least one second query data point; and
   the device further comprises at least one second processing element to identify at least one second set of nearest neighbors to the at least one second query data point in the first buffer from the matrix of candidate data points in the second buffer.

Statement 3. An embodiment of the disclosure includes the device according to statement 1, wherein the device is implemented using at least one of a Field Programmable Gate Array (FPGA), an Application-Specific Integrated Circuit (ASIC), a central processing unit (CPU), a graphics processing unit (GPU), a general purpose GPU (GPGPU), or a tensor processing unit (TPU).

Statement 4. An embodiment of the disclosure includes the device according to statement 1, wherein the processing element includes:
    a distance calculator to calculate a distance between the query data point and a candidate data point in the matrix of candidate data points; and
    storage for a list of indices of candidate data points in the set of nearest neighbors, the list of indices including an index for the candidate data point in the matrix of candidate data points.

Statement 5. An embodiment of the disclosure includes the device according to statement 4, wherein the storage is further configured to store distances between the query data point and candidate data points identified by the list of indices.

Statement 6. An embodiment of the disclosure includes the device according to statement 5, wherein the storage is configured to store the list of indices sorted according to the distances between the query data point and the candidate data points identified by the list of indices.

Statement 7. An embodiment of the disclosure includes the device according to statement 1, further comprising a memory to store the matrix of candidate data points.

Statement 8. An embodiment of the disclosure includes the device according to statement 7, wherein the memory includes a dynamic random access memory (DRAM).

Statement 9. An embodiment of the disclosure includes the device according to statement 7, wherein the device is configured to load the matrix of candidate data points into the memory from a storage device.

Statement 10. An embodiment of the disclosure includes the device according to statement 9, further comprising a module to generate a second matrix of candidate data points from the matrix of candidate data points using random projection.

Statement 11. An embodiment of the disclosure includes the device according to statement 10, wherein the module is configured to store the second matrix of candidate data points into the memory.

Statement 12. An embodiment of the disclosure includes the device according to statement 11, wherein the module includes at least one second module to calculate a sparse dot product of a candidate data point in the matrix of candidate data points and a random projection vector.

Statement 13. An embodiment of the disclosure includes the device according to statement 12, wherein the second module is configured to operate on coordinates from the candidate data point based at least in part on a corresponding non-zero value in the random projection vector.

Statement 14. An embodiment of the disclosure includes the device according to statement 10, wherein:
    the matrix of candidate data points includes a first dimensionality;
    the second matrix of candidate data points includes a second dimensionality; and
    the second dimensionality is smaller than the first dimensionality.

Statement 15. An embodiment of the disclosure includes the device according to statement 9, wherein the storage device includes one of a Solid State Drive (SSD) or a hard disk drive.

Statement 16. An embodiment of the disclosure includes the device according to statement 1, wherein the device is configured to load the matrix of candidate data points from a memory.

Statement 17. An embodiment of the disclosure includes the device according to statement 16, further comprising a module to generate a second matrix of candidate data points from the matrix of candidate data points using random projection.

Statement 18. An embodiment of the disclosure includes the device according to statement 17, wherein the module is configured to store the second matrix of candidate data points into the memory.

Statement 19. An embodiment of the disclosure includes the device according to statement 18, wherein the module includes at least one second module to calculate a sparse dot product of a candidate data point in the matrix of candidate data points and a random projection vector.

Statement 20. An embodiment of the disclosure includes the device according to statement 19, wherein the second module is configured to operate on coordinates from the candidate data point based at least in part on a corresponding non-zero value in the random projection vector.

Statement 21. An embodiment of the disclosure includes the device according to statement 17, wherein:
    the matrix of candidate data points includes a first dimensionality;
    the second matrix of candidate data points includes a second dimensionality; and
    the second dimensionality is smaller than the first dimensionality.

Statement 22. An embodiment of the disclosure includes the device according to statement 16, wherein the memory includes a dynamic random access memory (DRAM).

Statement 23. An embodiment of the disclosure includes an device, comprising:
    a memory to store a first vector including a first number of coordinates; and
    a module to generate a second vector from the first vector, the second vector including a second number of coordinates using random projection,
    wherein the second number of coordinates is smaller than the first number of coordinates.

Statement 24. An embodiment of the disclosure includes the device according to statement 23, wherein the device is implemented using at least one of a Field Programmable Gate Array (FPGA), an Application-Specific Integrated Circuit (ASIC), a central processing unit (CPU), a graphics processing unit (GPU), a general purpose GPU (GPGPU), or a tensor processing unit (TPU).

Statement 25. An embodiment of the disclosure includes the device according to statement 23, wherein the module is configured to generate a second vector from the first vector based at least in part on a random projection vector.

Statement 26. An embodiment of the disclosure includes the device according to statement 23, wherein the module is configured to store the second vector in the memory.

Statement 27. An embodiment of the disclosure includes the device according to statement 23, wherein the memory includes a dynamic random access memory (DRAM).

Statement 28. An embodiment of the disclosure includes the device according to statement 23, further comprising a processing element to process the second vector.

Statement 29. An embodiment of the disclosure includes the device according to statement 28, wherein the processing element is configured to read the second vector from the memory.

Statement 30. An embodiment of the disclosure includes the device according to statement 28, wherein the processing element is configured to receive the second vector from the module.

Statement 31. An embodiment of the disclosure includes the device according to statement 28, wherein the processing element is configured to identify a set of nearest neighbors to second vector from a matrix of candidate data points.

Statement 32. An embodiment of the disclosure includes a system, comprising:
- a storage device, storing a first matrix of candidate data points; and
- an device, including:
  - a first buffer to store a query data point;
  - a second buffer to store a second matrix of candidate data points; and
  - a processing element to identify a set of nearest neighbors to the query data point in the first buffer from the second matrix of candidate data points in the second buffer.

Statement 33. An embodiment of the disclosure includes the system according to statement 32, wherein:
- the first buffer is configured to store at least one second query data point; and
- the device further comprises at least one second processing element to identify at least one second set of nearest neighbors to the at least one second query data point in the first buffer from the second matrix of candidate data points in the second buffer.

Statement 34. An embodiment of the disclosure includes the system according to statement 32, wherein the device is implemented using at least one of a Field Programmable Gate Array (FPGA), an Application-Specific Integrated Circuit (ASIC), a central processing unit (CPU), a graphics processing unit (GPU), a general purpose GPU (GPGPU), or a tensor processing unit (TPU).

Statement 35. An embodiment of the disclosure includes the system according to statement 32, wherein the storage device includes one of a Solid State Drive (SSD) or a hard disk drive.

Statement 36. An embodiment of the disclosure includes the system according to statement 32, wherein the processing element includes:
- a distance calculator to calculate a distance between the query data point and a candidate data point in the second matrix of candidate data points; and
- storage for a list of indices of candidate data points in the set of nearest neighbors, the list of indices including an index for the candidate data point in the second matrix of candidate data points.

Statement 37. An embodiment of the disclosure includes the system according to statement 36, wherein the storage is further configured to store distances between the query data point and candidate data points identified by the list of indices.

Statement 38. An embodiment of the disclosure includes the system according to statement 37, wherein the storage is configured to store the list of indices sorted according to the distances between the query data point and the candidate data points identified by the list of indices.

Statement 39. An embodiment of the disclosure includes the system according to statement 32, further comprising:
- a memory,
  wherein the storage device is configured to load at least one of the first matrix of candidate data points or the second matrix of candidate data points into the memory.

Statement 40. An embodiment of the disclosure includes the system according to statement 39, wherein the device further includes the memory.

Statement 41. An embodiment of the disclosure includes the system according to statement 39, wherein the memory includes a dynamic random access memory (DRAM).

Statement 42. An embodiment of the disclosure includes the system according to statement 39, wherein the device is configured to store the second matrix of candidate data points into the memory from the storage device.

Statement 43. An embodiment of the disclosure includes the system according to statement 42, further comprising a module to generate the second matrix of candidate data points from the first matrix of candidate data points using random projection.

Statement 44. An embodiment of the disclosure includes the system according to statement 43, wherein the device includes the module.

Statement 45. An embodiment of the disclosure includes the system according to statement 43, wherein the module is configured to store the second matrix of candidate data points into the memory.

Statement 46. An embodiment of the disclosure includes the system according to statement 45, wherein the module includes at least one second module to calculate a sparse dot product of a candidate data point in the second matrix of candidate data points and a random projection vector.

Statement 47. An embodiment of the disclosure includes the system according to statement 46, wherein the second module is configured to operate on coordinates from the candidate data point based at least in part on a corresponding non-zero value in the random projection vector.

Statement 48. An embodiment of the disclosure includes the system according to statement 43, wherein:
- the first matrix of candidate data points includes a first dimensionality;
- the second matrix of candidate data points includes a second dimensionality; and
- the second dimensionality is smaller than the first dimensionality.

Statement 49. An embodiment of the disclosure includes a system, comprising:
- a storage device; and
- an device, including:
  - a memory to a first vector including a first number of coordinates; and
  - a module to generate a second vector from the first vector, the second vector including a second number of coordinates using random projection,
  wherein the second number of coordinates is smaller than the first number of coordinates.

Statement 50. An embodiment of the disclosure includes the system according to statement 49, wherein the device is implemented using at least one of a Field Programmable Gate Array (FPGA), an Application-Specific Integrated Circuit (ASIC), a central processing unit (CPU), a graphics processing unit (GPU), a general purpose GPU (GPGPU), or a tensor processing unit (TPU).

Statement 51. An embodiment of the disclosure includes the system according to statement 49, wherein the module is configured to generate a second vector from the first vector based at least in part on a random projection vector.

Statement 52. An embodiment of the disclosure includes the system according to statement 49, wherein the storage device includes one of a Solid State Drive (SSD) or a hard disk drive.

Statement 53. An embodiment of the disclosure includes the system according to statement 49, wherein the device is configured to load the first vector into the memory from the storage device.

Statement 54. An embodiment of the disclosure includes the system according to statement 49, wherein the module is configured to store the second vector in the memory.

Statement 55. An embodiment of the disclosure includes the system according to statement 49, wherein the module is configured to store the second vector in the storage device.

Statement 56. An embodiment of the disclosure includes the system according to statement 49, wherein the memory includes a dynamic random access memory (DRAM).

Statement 57. An embodiment of the disclosure includes the system according to statement 49, further comprising a processing element to process the second vector.

Statement 58. An embodiment of the disclosure includes the system according to statement 57, wherein the processing element is configured to read the second vector from the memory.

Statement 59. An embodiment of the disclosure includes the system according to statement 57, wherein the processing element is configured to receive the second vector from the module.

Statement 60. An embodiment of the disclosure includes the system according to statement 57, wherein the processing element is configured to read the second vector from the storage device.

Statement 61. An embodiment of the disclosure includes the system according to statement 57, wherein the processing element is configured to identify a set of nearest neighbors to second vector from a matrix of candidate data points.

Statement 62. An embodiment of the disclosure includes a method, comprising:
  storing a query data point into a first buffer of an device;
  storing a matrix of candidate data points into a second buffer of the device; and
  processing the matrix of candidate data points in the second buffer using a processing element of the device to identify a set of nearest neighbors in the matrix of candidate data points in the second buffer to the query data point in the first buffer.

Statement 63. An embodiment of the disclosure includes the method according to statement 62, wherein:
  storing the query data point into the first buffer of the device includes storing at least one second query data point into the first buffer of the device; and
  processing the matrix of candidate data points in the second buffer using the processing element of the device to identify the set of nearest neighbors in the matrix of candidate data points in the second buffer to the query data point in the first buffer includes processing the matrix of candidate data points in the second buffer using at least one second processing element of the device to identify at least one second set of nearest neighbors in the matrix of candidate data points in the second buffer to the at least one second query data point in the first buffer.

Statement 64. An embodiment of the disclosure includes the method according to statement 62, wherein the device is implemented using at least one of a Field Programmable Gate Array (FPGA), an Application-Specific Integrated Circuit (ASIC), a central processing unit (CPU), a graphics processing unit (GPU), a general purpose GPU (GPGPU), or a tensor processing unit (TPU).

Statement 65. An embodiment of the disclosure includes the method according to statement 62, wherein processing the matrix of candidate data points in the second buffer using a processing element of the device to identify a set of nearest neighbors in the matrix of candidate data points in the second buffer to the query data point in the first buffer includes:
  determining a distance between the query data point and a candidate data point in the matrix of candidate data points;
  associating the distance between the query data point and the candidate data point in the matrix of candidate data points with an index of the candidate data point in the matrix of candidate data points; and
  storing the distance and the index in a storage.

Statement 66. An embodiment of the disclosure includes the method according to statement 65, wherein storing the distance and the index in the storage includes:
  adding the distance and the index to a list in the storage to produce an updated list in the storage; and
  sorting the updated list in the storage.

Statement 67. An embodiment of the disclosure includes the method according to statement 66, wherein sorting the updated list in the storage includes performing an insertion sort on the list in the storage.

Statement 68. An embodiment of the disclosure includes the method according to statement 62, wherein storing the query data point into the first buffer of the device includes storing the query data point into the first buffer of the device from a memory.

Statement 69. An embodiment of the disclosure includes the method according to statement 68, wherein the device includes the memory.

Statement 70. An embodiment of the disclosure includes the method according to statement 68, wherein the memory is external to the device.

Statement 71. An embodiment of the disclosure includes the method according to statement 68, wherein the memory includes a dynamic random access memory (DRAM).

Statement 72. An embodiment of the disclosure includes the method according to statement 62, wherein storing the query data point into the first buffer of the device includes storing the query data point into the first buffer of the device from a storage device.

Statement 73. An embodiment of the disclosure includes the method according to statement 72, wherein the storage device includes one of a Solid State Drive (SSD) or a hard disk drive.

Statement 74. An embodiment of the disclosure includes the method according to statement 62, wherein storing the matrix of candidate data points into the second buffer of the device includes storing the matrix of candidate data points into the second buffer of the device from a memory.

Statement 75. An embodiment of the disclosure includes the method according to statement 74, wherein the device includes the memory.

Statement 76. An embodiment of the disclosure includes the method according to statement 74, wherein the memory is external to the device.

Statement 77. An embodiment of the disclosure includes the method according to statement 74, wherein the memory includes a dynamic random access memory (DRAM).

Statement 78. An embodiment of the disclosure includes the method according to statement 62, wherein storing the matrix of candidate data points into the second buffer of the device includes storing the matrix of candidate data points into the second buffer of the device from a storage device.

Statement 79. An embodiment of the disclosure includes the method according to statement 78, wherein the storage device includes one of a Solid State Drive (SSD) or a hard disk drive.

Statement 80. An embodiment of the disclosure includes the method according to statement 62, wherein storing the matrix of candidate data points into the second buffer of the device includes:
performing a random projection on the matrix of candidate data points using a module of the device to produce a second matrix of candidate data points; and
storing the second matrix of candidate data points in the second buffer of the device.

Statement 81. An embodiment of the disclosure includes the method according to statement 80, wherein storing the second matrix of candidate data points in the second buffer of the device includes:
storing the second matrix of candidate data points in a memory; and
reading the second matrix of candidate data points from the memory.

Statement 82. An embodiment of the disclosure includes the method according to statement 81, wherein the device includes the memory.

Statement 83. An embodiment of the disclosure includes the method according to statement 81, wherein the memory is external to the device.

Statement 84. An embodiment of the disclosure includes the method according to statement 81, wherein the memory includes a dynamic random access memory (DRAM).

Statement 85. An embodiment of the disclosure includes the method according to statement 80, wherein performing the random projection on the matrix of candidate data points using the module of the device to produce the second matrix of candidate data points includes performing a sparse dot product of a candidate data point in the second matrix of candidate data points and a random projection vector.

Statement 86. An embodiment of the disclosure includes the method according to statement 85, wherein performing the sparse dot product of the candidate data point in the second matrix of candidate data points and the random projection vector includes performing the sparse dot product of the candidate data point in the second matrix of candidate data points and the random projection vector based at least in part on a non-zero value in the random projection value.

Statement 87. An embodiment of the disclosure includes the method according to statement 62, wherein:
the matrix of candidate data points includes a first dimensionality;
the second matrix of candidate data points includes a second dimensionality; and
the second dimensionality is smaller than the first dimensionality.

Statement 88. An embodiment of the disclosure includes a method, comprising: storing a first matrix of candidate data points into a buffer of an device; and performing a random projection on the first matrix of candidate data points in the buffer of the device using a module of the device to produce a second matrix of candidate data points.

Statement 89. An embodiment of the disclosure includes the method according to statement 88, wherein the device is implemented using at least one of a Field Programmable Gate Array (FPGA), an Application-Specific Integrated Circuit (ASIC), a central processing unit (CPU), a graphics processing unit (GPU), a general purpose GPU (GPGPU), or a tensor processing unit (TPU).

Statement 90. An embodiment of the disclosure includes the method according to statement 88, further comprising storing the second matrix of candidate data points.

Statement 91. An embodiment of the disclosure includes the method according to statement 90, wherein storing the second matrix of candidate data points includes storing the second matrix of candidate data points in a memory.

Statement 92. An embodiment of the disclosure includes the method according to statement 91, wherein the device includes the memory.

Statement 93. An embodiment of the disclosure includes the method according to statement 91, wherein the memory is external to the device.

Statement 94. An embodiment of the disclosure includes the method according to statement 91, wherein the memory includes a dynamic random access memory (DRAM).

Statement 95. An embodiment of the disclosure includes the method according to statement 90, wherein storing the second matrix of candidate data points includes storing the second matrix of candidate data points on a storage device.

Statement 96. An embodiment of the disclosure includes the method according to statement 95, wherein the storage device includes one of a Solid State Drive (SSD) or a hard disk drive.

Statement 97. An embodiment of the disclosure includes the method according to statement 90, wherein storing the second matrix of candidate data points includes storing the second matrix of candidate data points in the buffer of the device.

Statement 98. An embodiment of the disclosure includes the method according to statement 90, wherein storing the second matrix of candidate data points includes storing the second matrix of candidate data points in a second buffer of the device.

Statement 99. An embodiment of the disclosure includes the method according to statement 98, wherein the device includes a processing element configured to process the second matrix of candidate data points.

Statement 100. An embodiment of the disclosure includes the method according to statement 99, wherein the processing element includes the second buffer.

Statement 101. An embodiment of the disclosure includes the method according to statement 99, further comprising processing the matrix of candidate data points in the second buffer using the processing element of the device to identify a set of nearest neighbors in the matrix of candidate data points in the second buffer to a query data point.

Statement 102. An embodiment of the disclosure includes the method according to statement 101, wherein performing the random projection on the first matrix of candidate data points in the buffer of the device using the module of the device to produce the second matrix of candidate data points includes performing a sparse dot product of a candidate data point in the second matrix of candidate data points and a random projection vector.

Statement 103. An embodiment of the disclosure includes the method according to statement 102, wherein performing the sparse dot product of the candidate data point in the second matrix of candidate data points and the random projection vector includes performing the sparse dot product of the candidate data point in the second matrix of candidate data points and the random projection vector based at least in part on a non-zero value in the random projection value.

Statement 104. An embodiment of the disclosure includes an article, comprising a non-transitory storage medium, the non-transitory storage medium having stored thereon instructions that, when executed by a machine, result in:
storing a query data point into a first buffer of an device;
storing a matrix of candidate data points into a second buffer of the device; and
processing the matrix of candidate data points in the second buffer using a processing element of the device to identify a set of nearest neighbors in the matrix of candidate data points in the second buffer to the query data point in the first buffer.

Statement 105. An embodiment of the disclosure includes the article according to statement 104, wherein:
storing the query data point into the first buffer of the device includes storing at least one second query data point into the first buffer of the device; and
processing the matrix of candidate data points in the second buffer using the processing element of the device to identify the set of nearest neighbors in the matrix of candidate data points in the second buffer to the query data point in the first buffer includes processing the matrix of candidate data points in the second buffer using at least one second processing element of the device to identify at least one second set of nearest neighbors in the matrix of candidate data points in the second buffer to the at least one second query data point in the first buffer.

Statement 106. An embodiment of the disclosure includes the article according to statement 104, wherein the device is implemented using at least one of a Field Programmable Gate Array (FPGA), an Application-Specific Integrated Circuit (ASIC), a central processing unit (CPU), a graphics processing unit (GPU), a general purpose GPU (GPGPU), or a tensor processing unit (TPU).

Statement 107. An embodiment of the disclosure includes the article according to statement 104, wherein processing the matrix of candidate data points in the second buffer using a processing element of the device to identify a set of nearest neighbors in the matrix of candidate data points in the second buffer to the query data point in the first buffer includes:
determining a distance between the query data point and a candidate data point in the matrix of candidate data points;
associating the distance between the query data point and the candidate data point in the matrix of candidate data points with an index of the candidate data point in the matrix of candidate data points; and
storing the distance and the index in a storage.

Statement 108. An embodiment of the disclosure includes the article according to statement 107, wherein storing the distance and the index in the storage includes:
adding the distance and the index to a list in the storage to produce an updated list in the storage; and
sorting the updated list in the storage.

Statement 109. An embodiment of the disclosure includes the article according to statement 108, wherein sorting the updated list in the storage includes performing an insertion sort on the list in the storage.

Statement 110. An embodiment of the disclosure includes the article according to statement 104, wherein storing the query data point into the first buffer of the device includes storing the query data point into the first buffer of the device from a memory.

Statement 111. An embodiment of the disclosure includes the article according to statement 110, wherein the device includes the memory.

Statement 112. An embodiment of the disclosure includes the article according to statement 110, wherein the memory is external to the device.

Statement 113. An embodiment of the disclosure includes the article according to statement 110, wherein the memory includes a dynamic random access memory (DRAM).

Statement 114. An embodiment of the disclosure includes the article according to statement 104, wherein storing the query data point into the first buffer of the device includes storing the query data point into the first buffer of the device from a storage device.

Statement 115. An embodiment of the disclosure includes the article according to statement 114, wherein the storage device includes one of a Solid State Drive (SSD) or a hard disk drive.

Statement 116. An embodiment of the disclosure includes the article according to statement 104, wherein storing the matrix of candidate data points into the second buffer of the device includes storing the matrix of candidate data points into the second buffer of the device from a memory.

Statement 117. An embodiment of the disclosure includes the article according to statement 116, wherein the device includes the memory.

Statement 118. An embodiment of the disclosure includes the article according to statement 116, wherein the memory is external to the device.

Statement 119. An embodiment of the disclosure includes the article according to statement 116, wherein the memory includes a dynamic random access memory (DRAM).

Statement 120. An embodiment of the disclosure includes the article according to statement 104, wherein storing the matrix of candidate data points into the second buffer of the device includes storing the matrix of candidate data points into the second buffer of the device from a storage device.

Statement 121. An embodiment of the disclosure includes the article according to statement 120, wherein the storage device includes one of a Solid State Drive (SSD) or a hard disk drive.

Statement 122. An embodiment of the disclosure includes the article according to statement 104, wherein storing the matrix of candidate data points into the second buffer of the device includes:
performing a random projection on the matrix of candidate data points using a module of the device to produce a second matrix of candidate data points; and
storing the second matrix of candidate data points in the second buffer of the device.

Statement 123. An embodiment of the disclosure includes the article according to statement 122, wherein storing the second matrix of candidate data points in the second buffer of the device includes:
storing the second matrix of candidate data points in a memory; and
reading the second matrix of candidate data points from the memory.

Statement 124. An embodiment of the disclosure includes the article according to statement 123, wherein the device includes the memory.

Statement 125. An embodiment of the disclosure includes the article according to statement 123, wherein the memory is external to the device.

Statement 126. An embodiment of the disclosure includes the article according to statement 123, wherein the memory includes a dynamic random access memory (DRAM).

Statement 127. An embodiment of the disclosure includes the article according to statement 122, wherein performing the random projection on the matrix of candidate data points using the module of the device to produce the second matrix of candidate data points includes performing a sparse dot product of a candidate data point in the second matrix of candidate data points and a random projection vector.

Statement 128. An embodiment of the disclosure includes the article according to statement 127, wherein performing the sparse dot product of the candidate data point in the second matrix of candidate data points and the random projection vector includes performing the sparse dot product of the candidate data point in the second matrix of candidate data points and the random projection vector based at least in part on a non-zero value in the random projection value.

Statement 129. An embodiment of the disclosure includes the article according to statement 104, wherein:
the matrix of candidate data points includes a first dimensionality;
the second matrix of candidate data points includes a second dimensionality; and
the second dimensionality is smaller than the first dimensionality.

Statement 130. An embodiment of the disclosure includes an article, comprising a non-transitory storage medium, the non-transitory storage medium having stored thereon instructions that, when executed by a machine, result in:
storing a first matrix of candidate data points into a buffer of an device; and
performing a random projection on the first matrix of candidate data points in the buffer of the device using a module of the device to produce a second matrix of candidate data points.

Statement 131. An embodiment of the disclosure includes the article according to statement 130, wherein the device is implemented using at least one of a Field Programmable Gate Array (FPGA), an Application-Specific Integrated Circuit (ASIC), a central processing unit (CPU), a graphics processing unit (GPU), a general purpose GPU (GPGPU), or a tensor processing unit (TPU).

Statement 132. An embodiment of the disclosure includes the article according to statement 130, the non-transitory storage medium having stored thereon further instructions that, when executed by the machine, result in storing the second matrix of candidate data points.

Statement 133. An embodiment of the disclosure includes the article according to statement 132, wherein storing the second matrix of candidate data points includes storing the second matrix of candidate data points in a memory.

Statement 134. An embodiment of the disclosure includes the article according to statement 133, wherein the device includes the memory.

Statement 135. An embodiment of the disclosure includes the article according to statement 133, wherein the memory is external to the device.

Statement 136. An embodiment of the disclosure includes the article according to statement 133, wherein the memory includes a dynamic random access memory (DRAM).

Statement 137. An embodiment of the disclosure includes the article according to statement 132, wherein storing the second matrix of candidate data points includes storing the second matrix of candidate data points on a storage device.

Statement 138. An embodiment of the disclosure includes the article according to statement 137, wherein the storage device includes one of a Solid State Drive (SSD) or a hard disk drive.

Statement 139. An embodiment of the disclosure includes the article according to statement 132, wherein storing the second matrix of candidate data points includes storing the second matrix of candidate data points in the buffer of the device.

Statement 140. An embodiment of the disclosure includes the article according to statement 132, wherein storing the second matrix of candidate data points includes storing the second matrix of candidate data points in a second buffer of the device.

Statement 141. An embodiment of the disclosure includes the article according to statement 140, wherein the device includes a processing element configured to process the second matrix of candidate data points.

Statement 142. An embodiment of the disclosure includes the article according to statement 141, wherein the processing element includes the second buffer.

Statement 143. An embodiment of the disclosure includes the article according to statement 141, the non-transitory storage medium having stored thereon further instructions that, when executed by the machine, result in processing the matrix of candidate data points in the second buffer using the processing element of the device to identify a set of nearest neighbors in the matrix of candidate data points in the second buffer to a query data point.

Statement 144. An embodiment of the disclosure includes the article according to statement 143, wherein performing the random projection on the first matrix of candidate data points in the buffer of the device using the module of the device to produce the second matrix of candidate data points includes performing a sparse dot product of a candidate data point in the second matrix of candidate data points and a random projection vector.

Statement 145. An embodiment of the disclosure includes the article according to statement 144, wherein performing the sparse dot product of the candidate data point in the second matrix of candidate data points and the random projection vector includes performing the sparse dot product of the candidate data point in the second matrix of candidate data points and the random projection vector based at least in part on a non-zero value in the random projection value.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A device, comprising:
non-volatile storage for a query data point;
a controller to access the query data point from the non-volatile storage based at least in part on a request from a processor;
a first buffer to store the query data point from the non-volatile storage;
a module to generate a second data structure from a first data structure, the module configured to perform a computation based at least in part on the first data structure and a vector;
a second buffer to store the second data structure; and
a processing element to identify a set of nearest neighbors to the query data point in the first buffer from the second data structure in the second buffer,
wherein the device is configured to transfer at least one of the first data structure or the second data structure into a memory accessible by the processor.

2. The device according to claim 1, wherein the first buffer, the module, the second buffer, and the processing element are implemented using at least one of a Field Programmable Gate Array (FPGA), an Application-Specific Integrated Circuit (ASIC), a central processing unit (CPU), a graphics processing unit (GPU), a general purpose GPU (GPGPU), or a tensor processing unit (TPU).

3. The device according to claim 1, wherein the processing element includes:
a distance calculator to calculate a distance between the query data point and a second candidate data point in the second data structure; and storage for a list of indices of second candidate data points in the set of nearest neighbors, the list of indices including an index for the second candidate data point in the second data structure.

4. The device according to claim 1, wherein:
the first data structure includes a first matrix of candidate data points; and
the second data structure includes a second matrix of candidate data points.

5. The device according to claim 1, wherein the module is configured to perform a dot product computation based at least in part on the first data structure and the vector.

6. The device according to claim 5, wherein the module is configured to perform a sparse dot product computation based at least in part on first data structure and the vector.

7. The device according to claim 1, wherein the vector includes a random projection vector.

8. The device according to claim 1, wherein the first buffer and the second buffer are reconfigurable in size for storing the query data point and the second data structure.

9. A system, comprising:
a storage device, storing a first data structure, the storage device including a non-volatile storage to store a query data point and a controller to access the query data from the non-volatile storage based at least in part on a request from a processor; and
a device, including:
a first buffer to store the query data point from the non-volatile storage;
a module to generate a second data structure from the first data structure, the module configured to perform a computation based at least in part on the first data structure and a vector;
a second buffer to store the second data structure;
a processing element to identify a set of nearest neighbors to the query data point in the first buffer from the second data structure in the second buffer; and
a memory accessible by the processor,
wherein the storage device is configured to transfer at least one of the first data structure or the second data structure into the memory accessible by the processor.

10. The system according to claim 9, wherein the device is implemented using at least one of a Field Programmable Gate Array (FPGA), an Application-Specific Integrated Circuit (ASIC), a central processing unit (CPU), a graphics processing unit (GPU), a general purpose GPU (GPGPU), or a tensor processing unit (TPU).

11. The system according to claim 9, wherein the processing element includes:
a distance calculator to calculate a distance between the query data point and a candidate data point in the second data structure; and
storage for a list of indices in the set of nearest neighbors, the list of indices including an index for the candidate data point in the second data structure.

12. The system according to claim 9, wherein the device is configured to transfer the second data structure into the memory accessible by the processor from the storage device.

13. The system according to claim 9, wherein the first buffer and the second buffer are reconfigurable in size for storing the query data point and the second data structure.

14. A method, comprising:
retrieving a query data point from a storage device, the storage device including a controller to access the query data point from a non-volatile storage of the storage device based at least in part on a request from a processor;
storing the query data point in a first buffer of a device;
performing a computation based at least in part on a first data structure and a vector to generate a second data structure;
storing the second data structure in a second buffer of the device;
processing the second data structure in the second buffer using a processing element of the device to identify a set of nearest neighbors in the second data structure in the second buffer to the query data point in the first buffer; and
transferring at least one of the first data structure or the second data structure into a memory accessible by the processor.

15. The method according to claim 14, wherein the first buffer and the second buffer are reconfigurable in size for storing the query data point and the second data structure.

16. The method according to claim 14, wherein the device includes the storage device.

17. The method according to claim 14, wherein processing the second data structure in the second buffer using the processing element of the device to identify the set of nearest neighbors in the second data structure in the second buffer to the query data point in the first buffer includes:
determining a distance between the query data point and a candidate data point in the second data structure;
associating the distance between the query data point and the candidate data point in the second data structure with an index of the candidate data point in the second data structure; and
storing the distance and the index in a storage.

18. The method according to claim 16, wherein performing the computation based at least in part on the first data structure and the vector to generate the second data structure includes performing a dot product computation on the first data structure and the vector to generate the second data structure.

19. The method according to claim 18, wherein performing the dot product computation based at least in part on the first data structure and the and the vector to generate the second data structure includes performing the dot product computation based at least in part on the first data structure and the vector based at least in part on a non-zero value in the vector.

* * * * *